United States Patent
Lynam et al.

(10) Patent No.: US 8,491,137 B2
(45) Date of Patent: Jul. 23, 2013

(54) VEHICLE MIRROR ASSEMBLY WITH WIDE ANGLE ELEMENT

(75) Inventors: Niall R. Lynam, Holland, MI (US); Mitchell D. Burkert, Grand Rapids, MI (US); Tyson P. DeJonge, Holland, MI (US); Hamid Habibi, Holland, MI (US); Keith D. Foote, Grand Rapids, MI (US); Donald S. Rawlings, Caledonia, MI (US); Michael J. Baur, Holland, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 560 days.

(21) Appl. No.: 12/561,642

(22) Filed: Sep. 17, 2009

(65) Prior Publication Data

US 2010/0079881 A1   Apr. 1, 2010

Related U.S. Application Data

(60) Provisional application No. 61/186,272, filed on Jun. 11, 2009, provisional application No. 61/153,120, filed on Feb. 17, 2009, provisional application No. 61/122,509, filed on Dec. 15, 2008, provisional application No. 61/098,429, filed on Sep. 19, 2008.

(51) Int. Cl.
*G02B 5/08* (2006.01)

(52) U.S. Cl.
USPC ............................. 359/844; 359/866

(58) Field of Classification Search
USPC ................................. 359/844, 866
See application file for complete search history.

(56) References Cited

U.S. PATENT DOCUMENTS

| | | |
|---|---|---|
| 1,114,559 A | 10/1914 | Weed |
| 1,672,559 A | 6/1928 | Doble |
| RE17,274 E | 4/1929 | Porter |
| 2,135,262 A | 11/1938 | Schumacher |
| 2,636,419 A | 4/1953 | Kerr |
| 2,778,273 A | 1/1957 | Fellmeth |
| 2,911,177 A | 11/1959 | West |
| 3,131,250 A | 4/1964 | Ely |
| 3,146,296 A | 8/1964 | Fischer |
| 3,170,985 A | 2/1965 | Katulich |

(Continued)

FOREIGN PATENT DOCUMENTS

| | | |
|---|---|---|
| DE | 3329998 | 3/1985 |
| DE | 3620228 | 12/1987 |

(Continued)

*Primary Examiner* — Jade R Chwasz
(74) *Attorney, Agent, or Firm* — Gardner, Linn, Burkhart & Flory, LLP

(57) ABSTRACT

A mirror reflective element assembly for an exterior rearview mirror assembly of a vehicle includes a reflective element and an auxiliary wide angle element. The reflective element has a front surface and a rear surface and a first reflector portion and a second reflector portion, with the first reflector portion having a first reflective coating disposed thereat. The auxiliary wide angle element is disposed at a rear surface of the glass mirror substrate of the reflective element and at the second reflector portion. The auxiliary wide angle element has a glass element having a curved rear surface with a second reflective coating disposed at the curved rear surface. An optical coupling element may be disposed between a front surface of the auxiliary wide angle element and the rear surface of the reflective element, the optical coupling element may be a substantially optically clear and flexible elastomer.

18 Claims, 15 Drawing Sheets

U.S. PATENT DOCUMENTS

| | | |
|---|---|---|
| 3,175,463 A | 3/1965 | Seashore |
| 3,267,806 A | 8/1966 | Azegami |
| 3,337,285 A | 8/1967 | Travis |
| 3,338,655 A | 8/1967 | Young |
| 3,375,053 A | 3/1968 | Ward |
| 3,389,952 A | 6/1968 | Tobin, Jr. |
| 3,404,935 A | 10/1968 | Creager |
| 3,408,136 A | 10/1968 | Travis |
| 3,424,517 A | 1/1969 | Budreck |
| 3,563,638 A | 2/1971 | Panozzo |
| 3,601,614 A | 8/1971 | Platzer, Jr. |
| 3,610,739 A | 10/1971 | Seashore |
| 3,667,833 A | 6/1972 | Baldwin, Sr. |
| 3,764,201 A | 10/1973 | Haile |
| 3,826,563 A | 7/1974 | Davis |
| 3,881,811 A | 5/1975 | French |
| 3,909,117 A | 9/1975 | Takahashi et al. |
| 4,200,359 A | 4/1980 | Lawson |
| 4,223,983 A | 9/1980 | Bloom |
| 4,258,979 A | 3/1981 | Mahin |
| 4,268,120 A | 5/1981 | Jitsumori |
| 4,293,191 A | 10/1981 | Kim |
| 4,303,308 A | 12/1981 | Kobrin |
| 4,306,770 A | 12/1981 | Marhauer |
| 4,311,363 A | 1/1982 | Marsalka et al. |
| 4,325,609 A | 4/1982 | Alford |
| 4,331,382 A | 5/1982 | Graff |
| 4,350,412 A | 9/1982 | Steenblik et al. |
| 4,436,372 A | 3/1984 | Schmidt et al. |
| 4,439,013 A | 3/1984 | Hagn et al. |
| 4,449,786 A | 5/1984 | McCord |
| 4,526,446 A | 7/1985 | Adams |
| 4,549,786 A | 10/1985 | Albers et al. |
| 4,575,202 A | 3/1986 | McGuire |
| 4,629,296 A | 12/1986 | White |
| 4,674,849 A | 6/1987 | Stewart |
| 4,678,294 A | 7/1987 | Van Nostrand |
| 4,712,879 A | 12/1987 | Lynam et al. |
| 4,715,701 A | 12/1987 | Urban |
| 4,824,231 A | 4/1989 | Quintana |
| 4,828,379 A | 5/1989 | Parsons et al. |
| 4,853,283 A | 8/1989 | Skolnick |
| 4,859,046 A | 8/1989 | Traynor et al. |
| 4,913,542 A | 4/1990 | Adolfsson |
| 4,917,485 A | 4/1990 | Baldwin, Sr. |
| 4,929,074 A | 5/1990 | Urban |
| 4,932,769 A | 6/1990 | Goosen |
| 4,932,770 A | 6/1990 | Caravaty |
| 4,989,964 A | 2/1991 | Meise |
| 5,005,962 A | 4/1991 | Edelman |
| 5,022,747 A | 6/1991 | Polanyi et al. |
| 5,033,835 A | 7/1991 | Platzer, Jr. |
| 5,044,739 A | 9/1991 | do Espirito Santo |
| 5,050,977 A | 9/1991 | Platzer, Jr. |
| 5,073,012 A | 12/1991 | Lynam |
| 5,076,673 A | 12/1991 | Lynam et al. |
| 5,080,492 A | 1/1992 | Platzer, Jr. |
| 5,115,346 A | 5/1992 | Lynam |
| 5,115,352 A | 5/1992 | do Espirito Santo |
| 5,118,540 A | 6/1992 | Hutchison |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,166,833 A | 11/1992 | Shyu |
| 5,237,458 A | 8/1993 | Polanyi et al. |
| 5,237,459 A | 8/1993 | Strauss |
| 5,239,405 A | 8/1993 | Varaprasad et al. |
| 5,247,395 A | 9/1993 | Martinez |
| 5,253,109 A | 10/1993 | O'Farrell et al. |
| 5,295,021 A | 3/1994 | Swanson |
| 5,296,973 A | 3/1994 | Burke |
| 5,355,245 A | 10/1994 | Lynam |
| 5,371,659 A | 12/1994 | Pastrick et al. |
| 5,406,414 A | 4/1995 | O'Farrell et al. |
| 5,412,512 A | 5/1995 | Zebold et al. |
| 5,424,875 A | 6/1995 | Davis, II |
| 5,432,643 A | 7/1995 | Huang |
| 5,497,305 A | 3/1996 | Pastrick et al. |
| 5,497,306 A | 3/1996 | Pastrick |
| 5,517,367 A | 5/1996 | Kim et al. |
| 5,523,877 A | 6/1996 | Lynam |
| 5,525,264 A | 6/1996 | Cronin et al. |
| 5,526,195 A | 6/1996 | Thomas |
| 5,530,588 A | 6/1996 | Vivier |
| 5,550,667 A | 8/1996 | Schofield et al. |
| 5,550,677 A | 8/1996 | Schofield et al. |
| 5,557,467 A | 9/1996 | McColgan et al. |
| 5,559,640 A | 9/1996 | Vachss et al. |
| 5,563,744 A | 10/1996 | Matsumiya |
| 5,567,360 A | 10/1996 | Varaprasad et al. |
| 5,579,133 A | 11/1996 | Black et al. |
| 5,594,593 A | 1/1997 | Milner |
| 5,610,756 A | 3/1997 | Lynam et al. |
| 5,621,569 A | 4/1997 | Schlenke |
| 5,621,577 A | 4/1997 | Lang et al. |
| 5,644,442 A | 7/1997 | Lemere |
| 5,668,663 A | 9/1997 | Varaprasad et al. |
| 5,669,699 A | 9/1997 | Pastrick et al. |
| 5,669,704 A | 9/1997 | Pastrick |
| 5,669,705 A | 9/1997 | Pastrick et al. |
| 5,670,935 A | 9/1997 | Schofield et al. |
| 5,691,855 A | 11/1997 | Lupkas |
| 5,715,093 A | 2/1998 | Schierbeek et al. |
| 5,724,187 A | 3/1998 | Varaprasad et al. |
| 5,751,489 A | 5/1998 | Caskey et al. |
| 5,760,962 A | 6/1998 | Schofield et al. |
| 5,784,211 A | 7/1998 | Mingledorff |
| 5,786,772 A | 7/1998 | Schofield et al. |
| 5,790,327 A | 8/1998 | Lee et al. |
| 5,793,542 A | 8/1998 | Kondo et al. |
| 5,796,094 A | 8/1998 | Schofield et al. |
| 5,805,367 A | 9/1998 | Kanazawa |
| 5,823,654 A | 10/1998 | Pastrick et al. |
| 5,835,294 A | 11/1998 | Minegishi |
| 5,847,889 A | 12/1998 | Komiyama et al. |
| 5,863,116 A | 1/1999 | Pastrick et al. |
| 5,864,434 A | 1/1999 | Taylor |
| 5,910,854 A | 6/1999 | Varaprasad et al. |
| 5,929,786 A | 7/1999 | Schofield et al. |
| 5,980,050 A | 11/1999 | McCord |
| 6,002,511 A | 12/1999 | Varaprasad et al. |
| 6,007,207 A | 12/1999 | Liu |
| 6,030,084 A | 2/2000 | Schmidt |
| 6,032,323 A | 3/2000 | Smith et al. |
| 6,033,078 A | 3/2000 | Su et al. |
| 6,097,023 A | 8/2000 | Schofield et al. |
| 6,109,586 A | 8/2000 | Hock |
| 6,116,743 A | 9/2000 | Hoek |
| 6,124,647 A | 9/2000 | Marcus et al. |
| 6,154,306 A | 11/2000 | Varaprasad et al. |
| 6,176,602 B1 | 1/2001 | Pastrick et al. |
| 6,178,034 B1 | 1/2001 | Allemand et al. |
| 6,198,409 B1 | 3/2001 | Schofield et al. |
| 6,199,993 B1 | 3/2001 | Mou |
| 6,201,642 B1 | 3/2001 | Bos |
| 6,227,689 B1 | 5/2001 | Miller |
| 6,250,148 B1 | 6/2001 | Lynam |
| 6,276,821 B1 | 8/2001 | Pastrick et al. |
| 6,294,989 B1 | 9/2001 | Schofield et al. |
| 6,315,419 B1 | 11/2001 | Platzer, Jr. |
| 6,341,523 B2 | 1/2002 | Lynam |
| 6,343,402 B1 | 2/2002 | Smith et al. |
| 6,396,397 B1 | 5/2002 | Bos et al. |
| 6,398,377 B1 | 6/2002 | Chou |
| 6,420,036 B1 | 7/2002 | Varaprasad et al. |
| 6,445,287 B1 | 9/2002 | Schofield et al. |
| 6,472,979 B2 | 10/2002 | Schofield et al. |
| 6,498,620 B2 | 12/2002 | Schofield et al. |
| 6,511,192 B1 | 1/2003 | Henion et al. |
| 6,522,451 B1 | 2/2003 | Lynam |
| 6,537,138 B2 | 3/2003 | Ohmori et al. |
| 6,582,109 B2 | 6/2003 | Miller |
| 6,690,268 B2 | 2/2004 | Schofield et al. |
| 6,717,610 B1 | 4/2004 | Bos et al. |
| 6,717,712 B2 | 4/2004 | Lynam et al. |
| 6,731,205 B2 | 5/2004 | Schofield et al. |
| 6,757,109 B2 | 6/2004 | Bos |

| | | |
|---|---|---|
| 6,882,287 B2 | 4/2005 | Schofield |
| 6,919,796 B2 * | 7/2005 | Boddy et al. ............... 340/425.5 |
| 6,932,483 B2 | 8/2005 | Strumolo et al. |
| 6,979,090 B1 | 12/2005 | Wnuk |
| 7,005,974 B2 | 2/2006 | McMahon et al. |
| 7,038,577 B2 | 5/2006 | Pawlicki et al. |
| 7,097,312 B2 * | 8/2006 | Platzer, Jr. .................... 359/864 |
| 7,126,456 B2 | 10/2006 | Boddy et al. |
| 7,167,294 B2 | 1/2007 | Lynam et al. |
| 7,168,830 B2 | 1/2007 | Pastrick et al. |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,267,448 B2 | 9/2007 | Schmidt et al. |
| 7,274,501 B2 | 9/2007 | McCabe et al. |
| 7,289,037 B2 | 10/2007 | Uken et al. |
| 7,338,177 B2 | 3/2008 | Lynam |
| 7,339,149 B1 | 3/2008 | Schofield et al. |
| 7,345,680 B2 | 3/2008 | David |
| 7,370,983 B2 | 5/2008 | DeWind et al. |
| 7,377,675 B2 | 5/2008 | Pastrick et al. |
| 7,391,563 B2 | 6/2008 | McCabe et al. |
| 7,400,435 B2 | 7/2008 | Byers et al. |
| 7,420,756 B2 | 9/2008 | Lynam |
| 7,423,522 B2 | 9/2008 | O'Brien et al. |
| 7,492,281 B2 | 2/2009 | Lynam et al. |
| 7,526,103 B2 | 4/2009 | Schofield et al. |
| 7,581,859 B2 | 9/2009 | Lynam |
| 7,626,749 B2 | 12/2009 | Baur et al. |
| 2002/0105741 A1 | 8/2002 | Platzer, Jr. |
| 2002/0159169 A1 | 10/2002 | McCord |
| 2003/0117731 A1 | 6/2003 | Platzer, Jr. |
| 2004/0165291 A1 | 8/2004 | Platzer, Jr. |
| 2005/0232469 A1 | 10/2005 | Schofield et al. |
| 2005/0248859 A1 | 11/2005 | Platzer, Jr. |
| 2006/0061008 A1 | 3/2006 | Karner et al. |
| 2006/0125919 A1 | 6/2006 | Camilleri et al. |
| 2006/0171704 A1 | 8/2006 | Bingle et al. |
| 2006/0184297 A1 | 8/2006 | Higgins-Luthman |
| 2006/0268440 A1 | 11/2006 | Platzer, Jr. |
| 2007/0058257 A1 | 3/2007 | Lynam |
| 2007/0285789 A1 | 12/2007 | Lindahl et al. |
| 2008/0212189 A1 | 9/2008 | Baur et al. |
| 2008/0225421 A1 | 9/2008 | Platzer |
| 2008/0304170 A1 | 12/2008 | Zhao |
| 2009/0040306 A1 | 2/2009 | Foote et al. |
| 2009/0115631 A1 | 5/2009 | Foote et al. |

FOREIGN PATENT DOCUMENTS

| | | |
|---|---|---|
| DE | 4026578 | 4/1992 |
| EP | 0210757 | 2/1987 |
| EP | 0310261 | 4/1989 |
| EP | 0551802 | 1/1992 |
| EP | 0728618 | 8/1996 |
| EP | 0729864 | 9/1996 |
| EP | 0791503 | 8/1997 |
| EP | 0917987 | 5/1999 |
| FR | 2628042 | 3/1988 |
| GB | 2048189 | 12/1980 |
| GB | 2092534 | 8/1982 |
| JP | 55076721 | 10/1980 |
| JP | 1186443 | 7/1989 |
| KR | 2002092059 | 12/2002 |
| WO | WO 0181956 | 11/2001 |
| WO | 2004026633 | 4/2004 |
| WO | 2004047421 | 6/2004 |
| WO | 2004103772 | 12/2004 |
| WO | 2006124682 | 11/2006 |
| WO | 2007005942 | 1/2007 |
| WO | WO 2008051910 | 5/2008 |

* cited by examiner

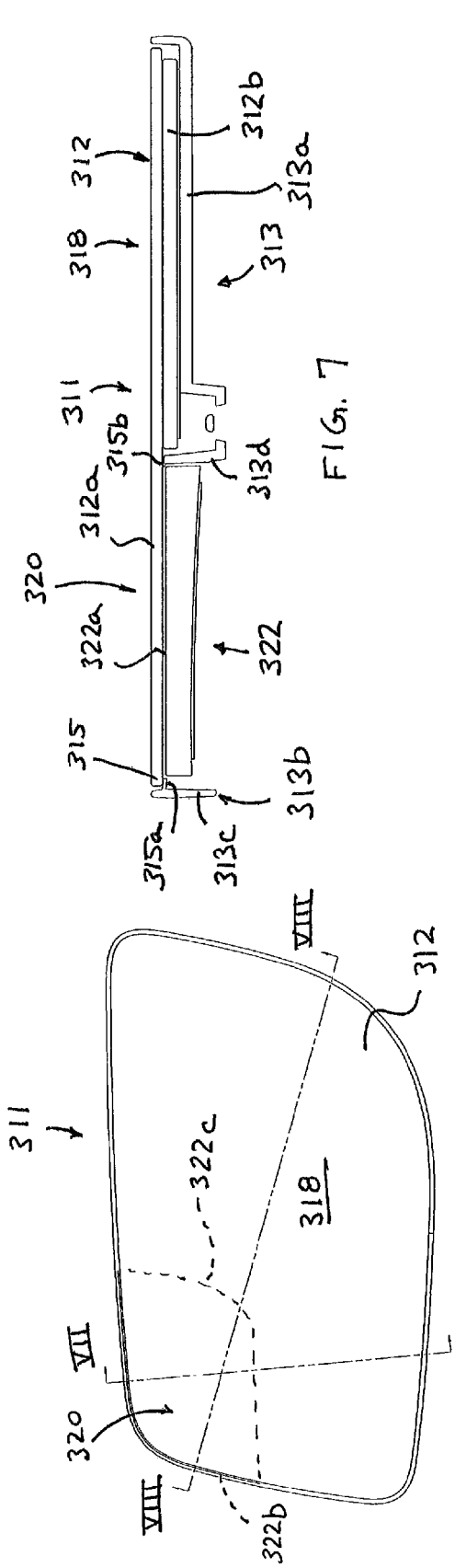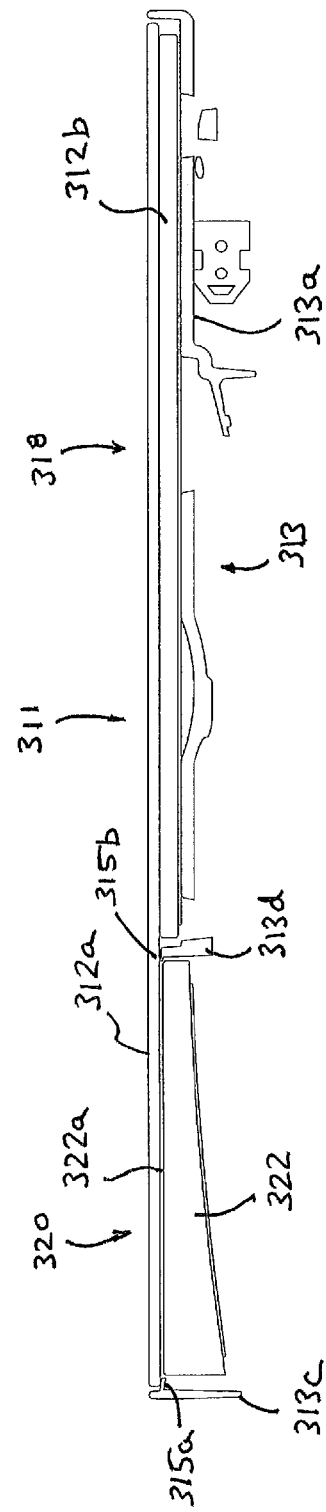

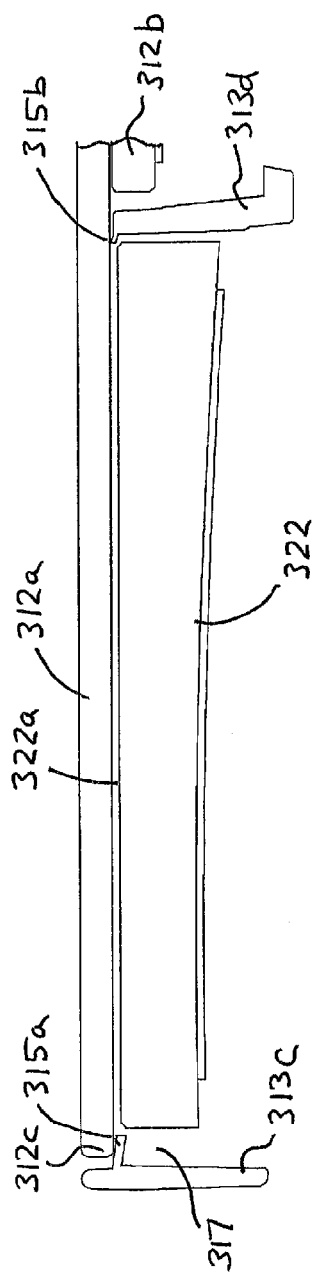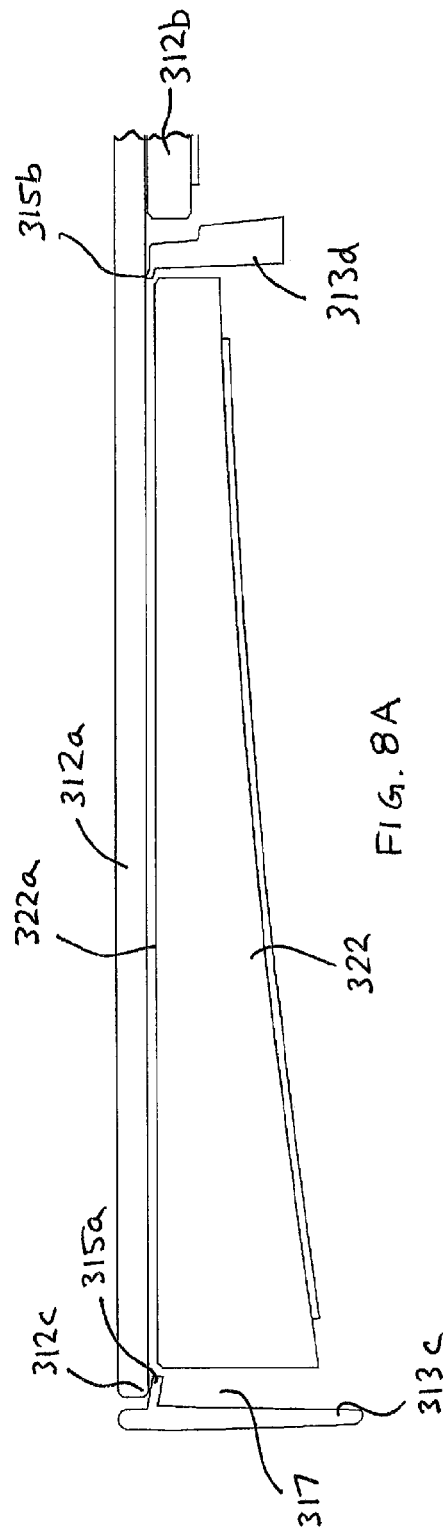

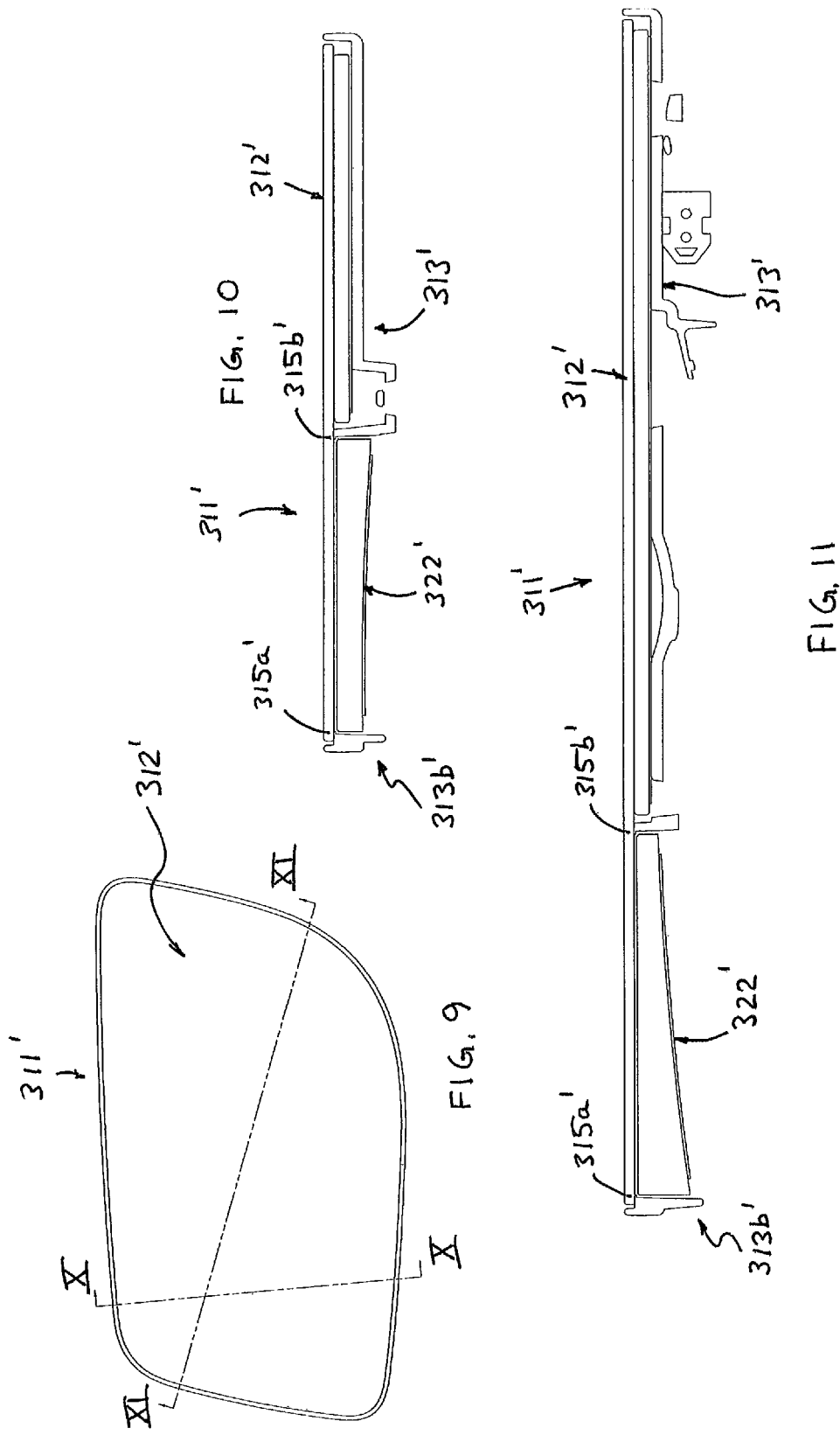

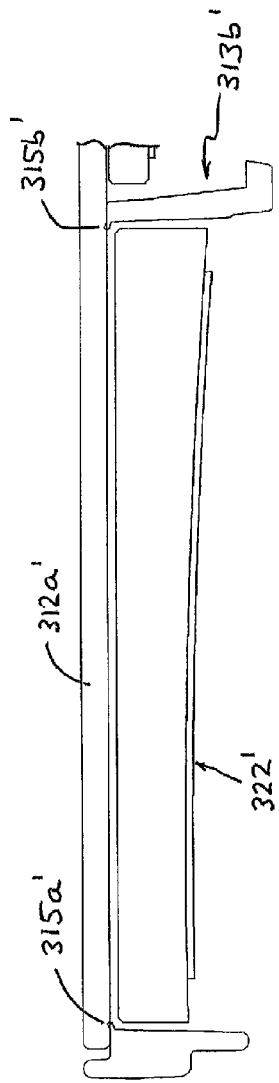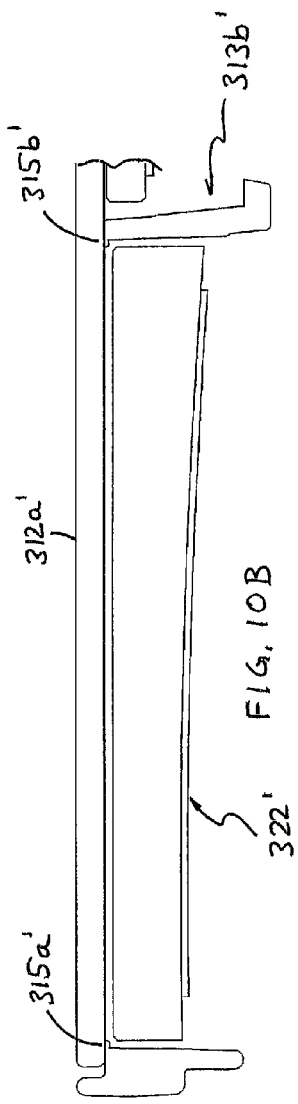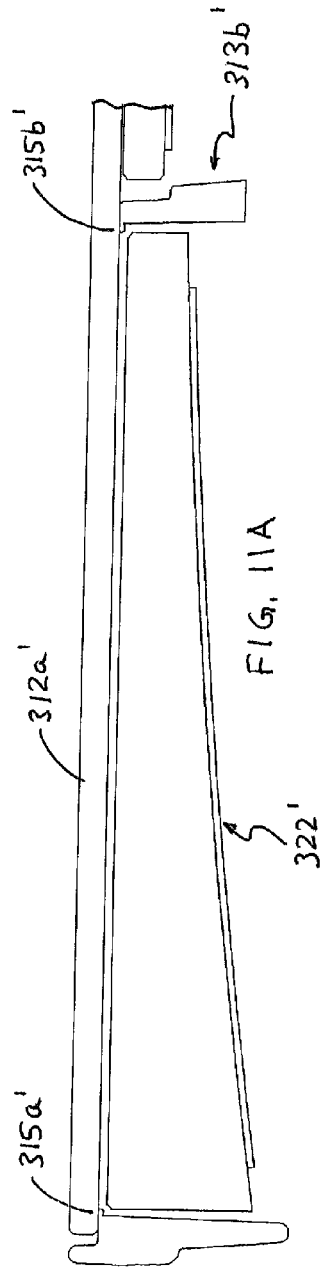
FIG. 10A
FIG. 10B
FIG. 11A

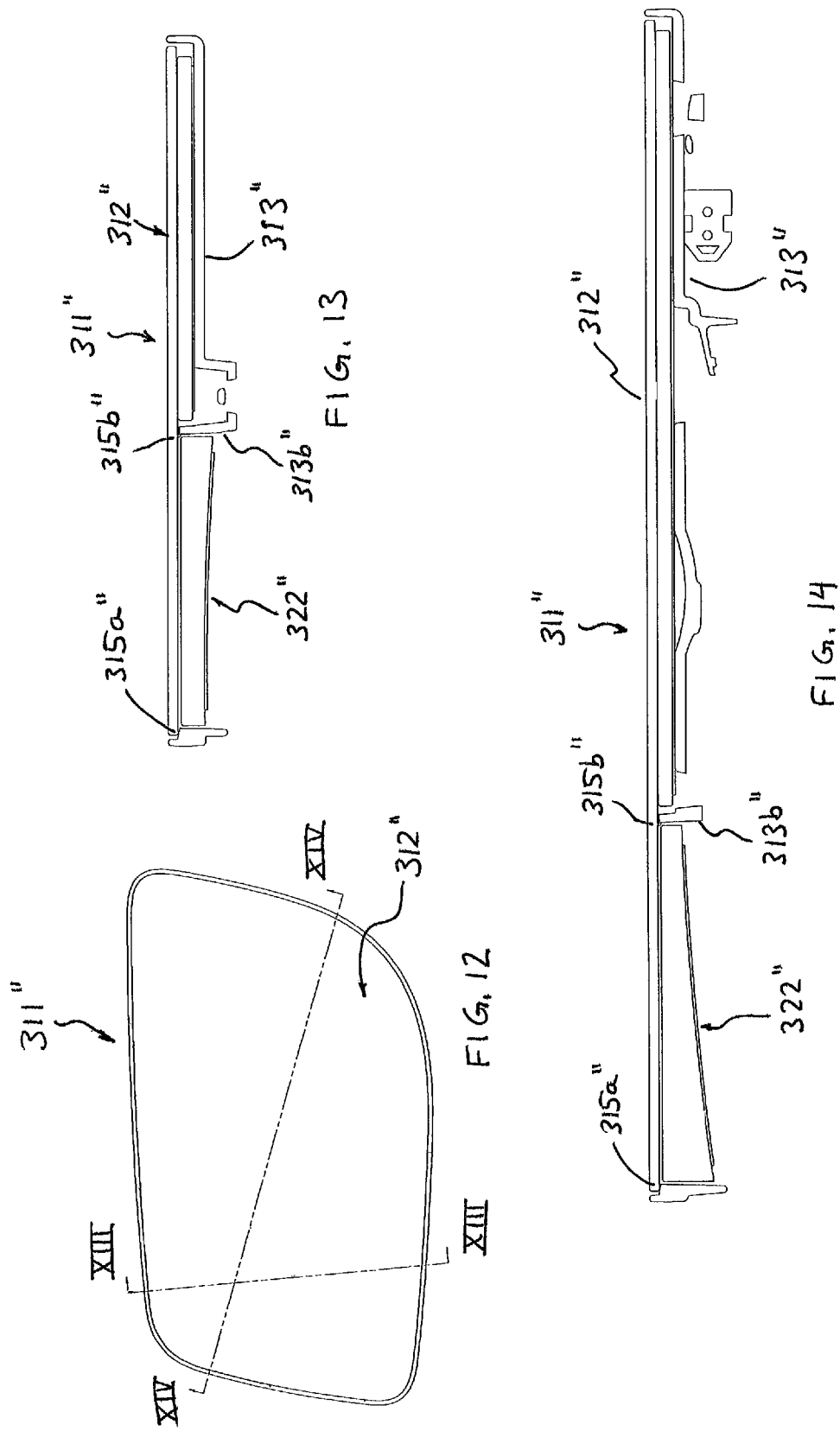

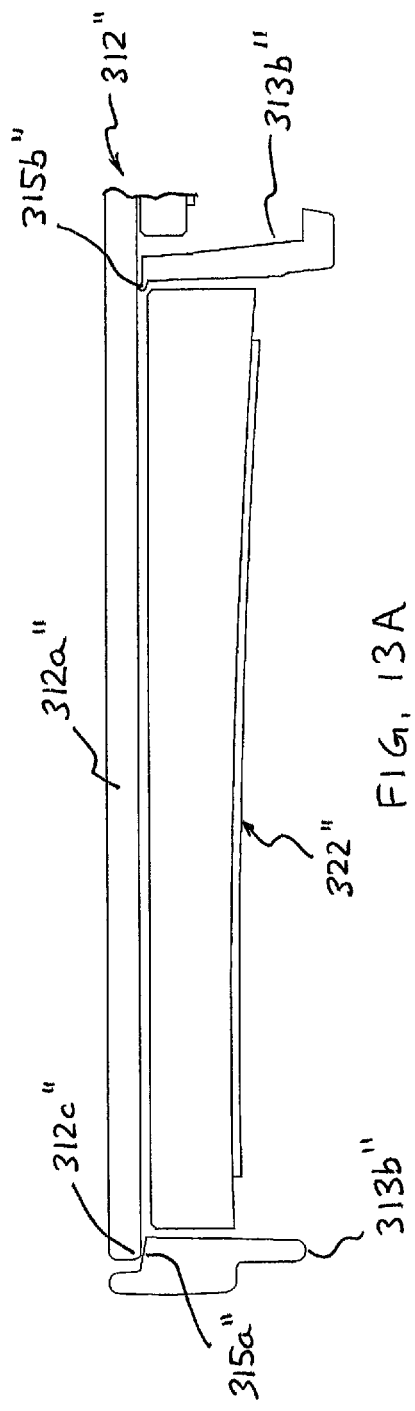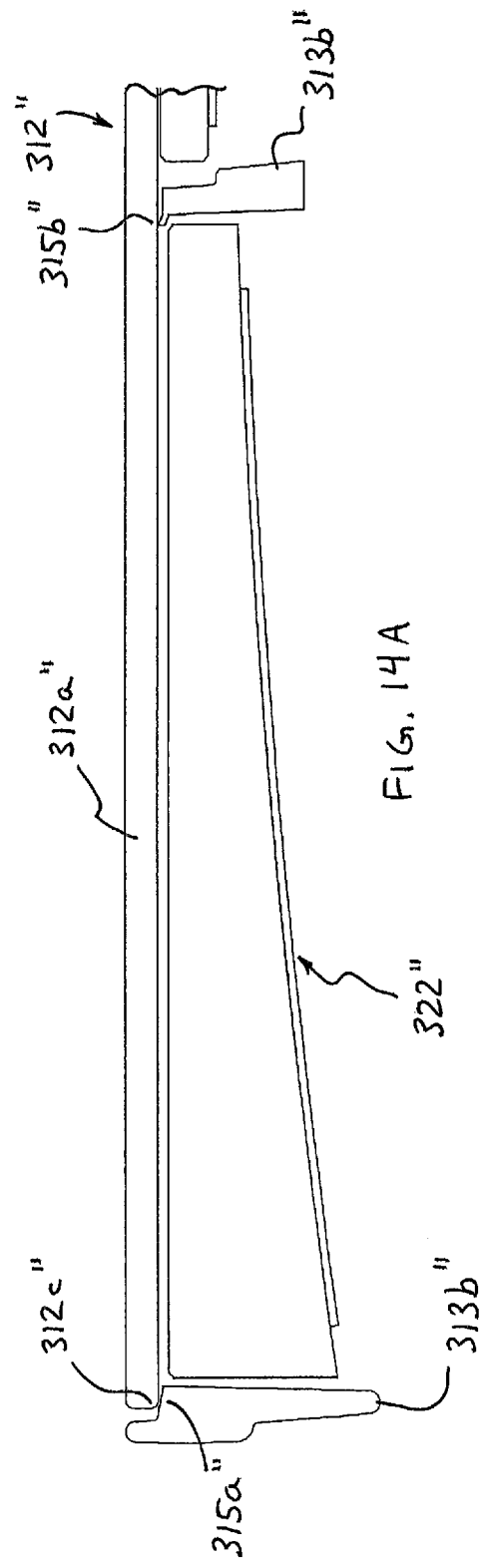

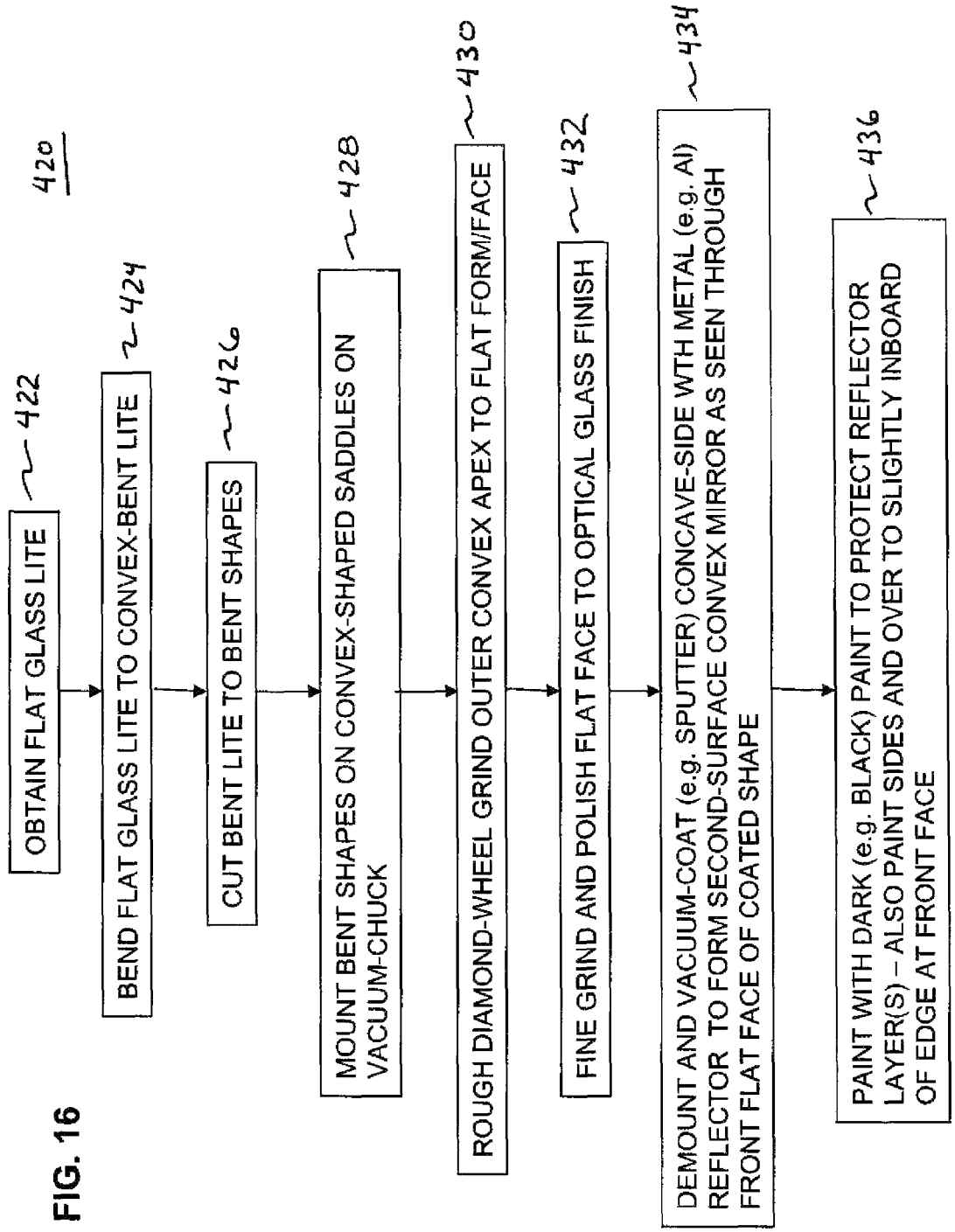

VEHICLE MIRROR ASSEMBLY WITH WIDE ANGLE ELEMENT

CROSS REFERENCE TO RELATED APPLICATIONS

The present application claims the benefit of U.S. provisional applications, Ser. No. 61/186,272, filed Jun. 11, 2009; Ser. No. 61/153,120, filed Feb. 17, 2009; Ser. No. 61/122,509, filed Dec. 15, 2008; and Ser. No. 61/098,429, filed Sep. 19, 2008, which are hereby incorporated herein by reference in their entireties.

FIELD OF THE INVENTION

The present invention relates to exterior rearview mirror assemblies and, more particularly, to an exterior rearview mirror assembly having an auxiliary wide angle reflector portion or optic for providing the driver with a wider angle rearward field of view as compared to a substantially planar portion of the rearview mirror.

BACKGROUND OF THE INVENTION

It is known to provide a wide angle rearward field of view to a driver of a vehicle via a wide angle reflective element at one or both of the exterior rearview mirror assemblies. Such a wide angle rearward field of view may be provided via a curved mirror reflector, or an auxiliary wide angle reflective element may be provided at a portion of a generally planar mirror reflector, such as via a curved auxiliary reflector element adhered to the generally planar mirror reflector. Such add-on curved auxiliary reflectors may be provided at the front surface or first surface (the surface of the mirror reflector that is generally facing rearward and at least partially toward the driver of the vehicle) and provide a reduced image size (as compared to the size of the generally planar reflector) wide angle rearward field of view that is readily viewable by the driver of the vehicle. Other auxiliary wide angle reflectors have been proposed, such as those described in U.S. Pat. Nos. 7,255,451; 7,195,381; 6,717,712; 7,126,456; 6,315,419; 7,097,312; 6,522,451; 6,315,419; 5,080,492; 5,050,977; and/or 5,033,835, which are hereby incorporated herein by reference in their entireties.

Typically, the process for adhering an auxiliary wide angle element to a reflective element of an exterior rear view mirror has been with use of a liquid adhesive. The process typically starts with dispensing a known volume of liquid adhesive on the mirror surface and the auxiliary wide angle element is then lowered very slowly on top of the adhesive. In order to not capture bubbles or to reduce the bubbles between the auxiliary wide angle element and the mirror reflective element, it is important to properly lower the auxiliary wide angle element on top of the liquid adhesive. This is typically done with a hinged motion where the auxiliary wide angle element makes contact on one side and then gradually is lowered on the opposite side. Since spacer beads are not used in such an application, the viscosity of the fluid must be selected such that when the robot lowers the auxiliary wide angle element to a pre-determined height, there is only a small amount of squeeze out. Also, if the adhesive viscosity is too low, the bond gap may not be maintained as the weight of the auxiliary wide angle element may compress the adhesive.

Other ways of laminating the auxiliary wide angle element to the mirror may use clear laminating tapes or PVB which would require an autoclave lamination process. Such an autoclave lamination process can be used for non-electrochromic applications, but for electrochromic applications, the auxiliary wide angle element would have to be attached to the glass substrate just after the conductive layer deposition and before dispensing the perimeter seal. This is because a finished electrochromic mirror reflective element will not survive the autoclave lamination which is typically at about 130 to 200 psi of pressure and at about 150 degrees Celsius.

SUMMARY OF THE INVENTION

The present invention provides an exterior rearview mirror reflective element assembly preferably having a generally planar principal reflector portion and an auxiliary wide angle reflector portion established at a portion or region of the mirror reflective element and at or near the mirror substrate, such as at an outer and upper corner region of the reflective element outboard of the side of the vehicle when the mirror assembly is mounted to the vehicle (or elsewhere at the mirror reflective element, such as at a lower outboard corner region of the reflective element or an upper or lower inboard corner region of the reflective element or any other region of the reflective element as desired and depending on the particular application of the mirror reflective element assembly).

According to an aspect of the present invention, an exterior rearview mirror assembly for a vehicle includes a reflective element having a glass mirror substrate having a front surface and a rear surface, a back plate attached to and generally supporting the reflective element, and an auxiliary wide angle optic or element. The reflective element comprises a first reflector portion and a second reflector portion, with the first reflector portion having a first reflective coating disposed thereat. The auxiliary wide angle element comprises a glass element and has a curved rear surface with a reflective coating disposed at the curved rear surface. An optical coupling layer or element is disposed between a front surface of the auxiliary wide angle element and the rear surface of the reflective element. The optical coupling element comprises a substantially optically clear, soft elastomeric element.

Optionally, the auxiliary wide angle element may be removably attached to the rear surface of the reflective element via the optical coupling element. Optionally, the back plate may have a receiving portion generally at the second reflector portion when the back plate is attached to the reflective element, and the auxiliary wide angle element may be received in the receiving portion and disposed at the rear surface of the reflective element and at the second reflector portion. The receiving portion of the back plate and/or a cover element or portion of the back plate may function to mechanically retain the auxiliary wide angle element at the rear surface of the reflective element substrate.

Optionally, the auxiliary wide angle element may be adhered to the rear of the reflective element via an optical adhesive. Optionally, the back plate (that may receive the auxiliary wide angle element within a pocket or receiving portion of the back plate) may include a wiper seal that engages and seals or substantially seals against the rear surface of the reflective element at a perimeter region at least partially around the auxiliary wide angle element to limit intrusion of the optical adhesive between the back plate and the reflective element when the auxiliary wide angle element is adhered to the reflective element. The wiper seal may be integrally molded with the back plate and formed during the same molding process (such as injection molding or the like) that forms the back plate.

These and other objects, advantages, purposes and features of the present invention will become apparent upon review of the following specification in conjunction with the drawings.

BRIEF DESCRIPTION OF THE DRAWINGS

FIG. 6 is a plan view of an exterior reflective element assembly having a wide angle element disposed at a wide angle region of a reflective element, with the back plate having a wiper seal established at least partially around the perimeter of the wide angle element;

FIG. 7 is a sectional view of the exterior reflective element assembly taken along the line VII-VII in FIG. 6;

FIG. 7A is an enlarged sectional view of the wide angle element and wiper seals of the reflective element assembly of FIG. 7;

FIG. 8 is a sectional view of the exterior reflective element assembly taken along the line VIII-VIII in FIG. 6;

FIG. 8A is an enlarged sectional view of the wide angle element and wiper seals of the reflective element assembly of FIG. 8;

FIG. 9 is a plan view of another exterior reflective element assembly having a wide angle element disposed at a wide angle region of a reflective element, with the back plate having a wiper seal established at least partially around the perimeter of the wide angle element;

FIG. 10 is a sectional view of the exterior reflective element assembly taken along the line X-X in FIG. 9;

FIG. 10A is an enlarged sectional view of the wide angle element and wiper seals of the reflective element assembly of FIG. 10, shown with the wiper seals in their molded or initial form;

FIG. 10B is another enlarged sectional view similar to FIG. 10A, shown with the wiper seals in their assembled form and engaging the rear surface of the reflective element;

FIG. 11 is a sectional view of the exterior reflective element assembly taken along the line XI-XI in FIG. 9;

FIG. 11A is an enlarged sectional view of the wide angle element and wiper seals of the reflective element assembly of FIG. 11;

FIG. 12 is a plan view of another exterior reflective element assembly having a wide angle element disposed at a wide angle region of a reflective element, with the back plate having a wiper seal established at least partially around the perimeter of the wide angle element;

FIG. 13 is a sectional view of the exterior reflective element assembly taken along the line XIII-XIII in FIG. 12;

FIG. 13A is an enlarged sectional view of the wide angle element and wiper seals of the reflective element assembly of FIG. 13;

FIG. 14 is a sectional view of the exterior reflective element assembly taken along the line XIV-XIV in FIG. 12;

FIG. 14A is an enlarged sectional view of the wide angle element and wiper seals of the reflective element assembly of FIG. 14;

FIG. 16 is a flow chart of a process of making a wide angle element in accordance with the present invention.

DESCRIPTION OF THE PREFERRED EMBODIMENTS

Figure 1:
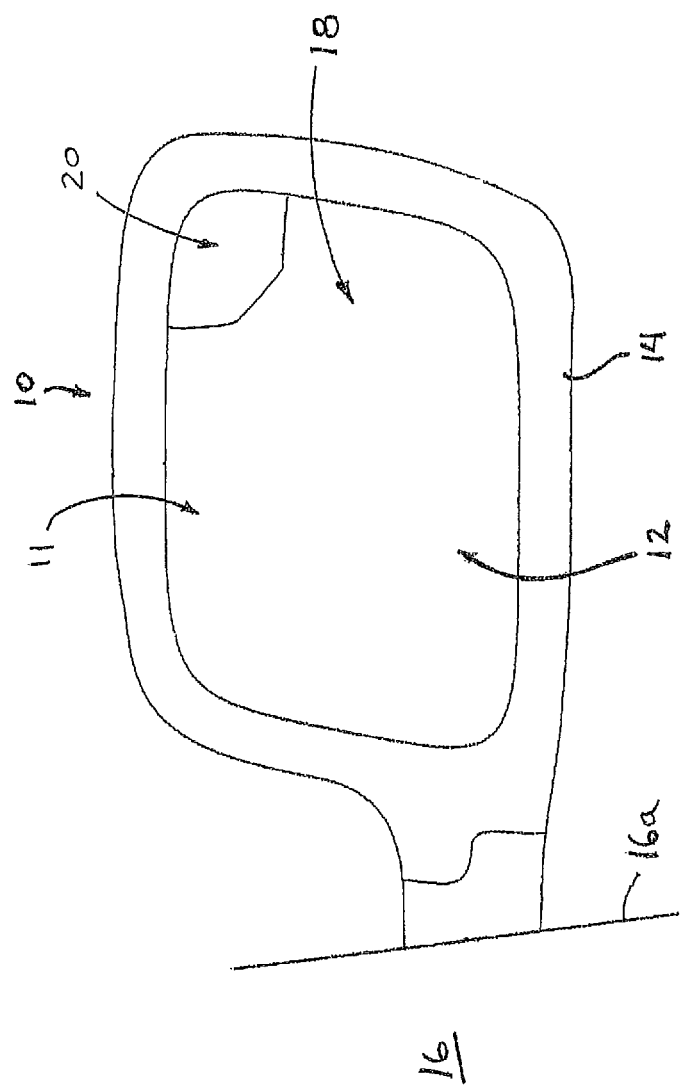
FIG. 1 is a front elevation of an exterior mirror assembly with an auxiliary wide angle element in accordance with the present invention, shown as viewed in the direction of travel of the vehicle.
Figure 2:
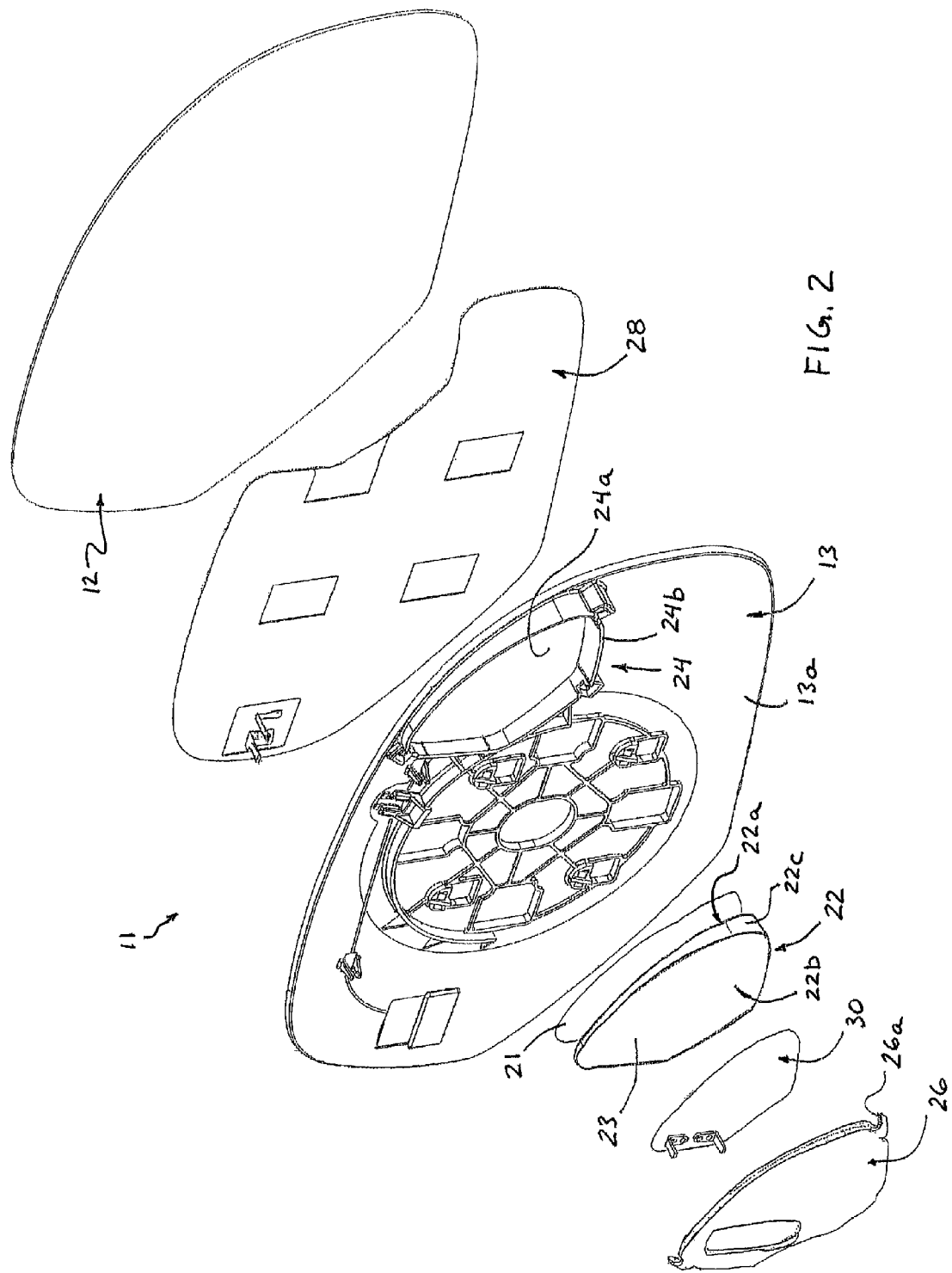
FIG. 2 is an exploded perspective view of an exterior mirror reflective element assembly of the present invention.

Referring now to the drawings and the illustrative embodiments depicted therein, an exterior rearview mirror assembly 10 for a vehicle includes a mirror reflective element assembly 11 having a mirror reflective element 12 attached to a back plate or mounting plate 13 and received in and/or supported by a mirror shell or casing 14 (FIGS. 1 and 2). Mirror assembly 10 is mounted at the side 16a of a host or subject vehicle 16. Mirror reflective element 12 provides a first or principal or main viewing mirror reflective element portion 18 and a second or auxiliary or wide angle reflective element portion 20. Reflective element assembly 11 includes an auxiliary wide angle element or wide angle reflective element or reflective optic or lens 22 established behind and at or near the wide angle portion 20 of the mirror reflective element 12 to provide an auxiliary or wide angle "spotter" mirror at the reflective element, as discussed below. The reflective element assembly may utilize aspects of the mirror assemblies described in U.S. Pat. Nos. 7,255,451; 7,195,381; 7,126,456; 7,097,312; 6,717,712; 6,522,451; 6,315,419; 5,080,492; 5,050,977; and/or 5,033,835, and/or U.S. patent application Ser. No. 12/054,960, filed Mar. 25, 2008 and published Sep. 18, 2008 as U.S. Pat. Publication No. US2008/0225421; Ser. No. 11/502,214, filed Aug. 10, 2006 and published Nov. 30, 2006 as U.S. Pat. Publication No. US2006/0268440; Ser. No. 11/116,523, filed Apr. 28, 2005 and published Nov. 10, 2005 as U.S. Pat. Publication No. US2005/0248859; Ser. No. 10/784,668, filed Feb. 23, 2004 and published Aug. 26, 2004 as U.S. Pat. Publication No. US2004/0165291; Ser. No. 10/280,042, filed Oct. 24, 2002 and published Jun. 26, 2003 as U.S. Pat. Publication No. US2003/0117731; and/or Ser. No. 09/733,410, filed Dec. 11, 2000 and published Aug. 8, 2002 as U.S. Pat. Publication No. US2002/0105741; and/or Ser. No. 12/187,725, filed Aug. 7, 2008, and/or PCT International Publication No. WO 01/81956 A1, published Nov. 1, 2001, which are hereby incorporated herein by reference in their entireties.

Mirror reflective element 12 may comprise a generally planar glass mirror substrate or substrates and may comprise a variably reflective, electro-optic reflective element (having a front and rear substrate with an electro-optic medium sandwiched therebetween) or a single substrate reflective element, while remaining within the spirit and scope of the present invention. The reflective element 12 has a reflector coating for reflecting light incident thereon to provide a rearward field of view to the driver of the vehicle. The reflector coating is disposed at an appropriate surface of the reflective element and at the principal reflecting portion 18 of the reflective element, while a window or non-reflective portion is established at the auxiliary portion 20 of the reflective element 12 (such as via masking of the auxiliary portion 20 during the reflector coating process of the reflective element glass substrate). For example, a window may be masked or formed through the mirror reflector coating or layer (such that a window area of the reflective element is substantially devoid of the mirror reflector coating, while the mirror reflector coating is present at the other regions of the principal reflecting area of the reflective element). The window may be formed via any suitable means, such as via masking of the window area during sputter deposition of the mirror reflector or the like, such as via utilizing aspects of the coating processes described in U.S. Pat. Nos. 7,274,501; 7,255,451 and/ or 7,184,190, and/or PCT Application No. PCT/US2006/ 018567, filed May 15, 2006 and published Nov. 23, 2006 as International Publication No. WO 2006/124682, which are all hereby incorporated herein by reference in their entireties.

Auxiliary wide angle element 22 is disposed at the rear of the reflective element 12 and at or behind the window formed in the reflector coating of the reflective element 12 (and at the auxiliary portion 20 of the reflective element 12). Auxiliary wide angle element 22 comprises a glass element having a front surface 22a, a curved rear surface 22b and a perimeter edge 22c, with a reflector coating or layer or element 23 disposed or established at the curved rear surface 22b. The reflector coating or layer may comprise any suitable reflector layer, such as a metallic coating or layer, such as chromium or silver or aluminum or alloys thereof; or an ITO/Ag/ITO stack of layers or coatings or a dielectric stack or a silicon metal reflector coating, or the like. The glass auxiliary wide angle element may be formed via casting or grinding the glass material, or via other suitable forming means, such as bending a flat glass substrate, as is commonly known in the art, to form the curved or bent element. The auxiliary wide angle element may have a spherical reflective property, an aspherical reflective property, or a compound curved reflective property depending on the particular application.

Optionally, if the reflector coating or layer at the auxiliary wide angle element or optic or lens is environmentally fragile or non-robust, a sealing or protective layer (not shown), such as a lacquer or paint or ink or the like, may be established over the reflector coating to substantially seal the reflector coating and/or to protect the reflector coating. Optionally, such a dark or opaque coating or layer, such as a black paint or coating or the like, may wrap around the edge of the auxiliary wide angle element and may extend for about 2 mm (or more or less) onto and over the perimeter region of the front surface of the auxiliary wide angle element. This can reduce any cosmetic issues that may otherwise arise due to reflections from a normal ground edge of the auxiliary wide angle element. For example, without such a dark border coating or paint, the edge of the auxiliary wide angle element may reveal normal imperfections that typically develop during the manufacturing of such a wide angle element.

The auxiliary wide angle element 22 is disposed behind the reflective element 12, such as at a perimeter region of the reflective element, such as at an outboard, upper region or outer upper quadrant of the reflective element (such as shown in FIG. 1) or elsewhere at the reflective element as may be selected depending on the particular application of the reflective element, and behind the auxiliary portion 20 of the reflective element 12. The front surface 22a of auxiliary wide angle element 22 may be substantially flat or planar for substantially uniformly engaging the rear surface of the mirror reflective element (optionally, the front surface of the wide angle element may be slightly curved for applications where the reflective element is slightly curved, while the rear surface of the wide angle element has a smaller radius of curvature than the front surface to provide a wider angle field of view to a person viewing the mirror assembly). Optionally, the auxiliary wide angle element 22 may be formed with a thicker outboard portion as compared to an inboard portion of the auxiliary wide angle element to enhance the wide angle view or partially sideward view provided by the auxiliary wide angle element.

The size, location and/or radius of curvature of the auxiliary wide angle element may be selected to provide the desired rearward field of view of the auxiliary wide angle element, such as, for example, a rearward field of view that encompasses the region between an outer limit of the viewing angle of the principal reflecting region of the mirror reflective element and the rearward limit of the driver's peripheral vision, or such as, for example, a rearward field of view that overlaps or substantially overlaps one or both of the outer limit or limits of the viewing angle of the principal reflecting region and the rearward limit of the driver's peripheral vision, or any other suitable rearward field of view depending on the particular application of the auxiliary wide angle element and mirror reflective element assembly. Optionally, two or more auxiliary wide angle elements or blind zone mirror elements may be disposed at the mirror assembly to provide two or more rearward wide angle fields of view to the driver of the vehicle (such as, for example, a first wide angle element that provides a generally sideward and rearward field of view that may at least span or overlap the viewing area between the rearward limit of the driver's peripheral field of view and the outboard limit of the rearview mirror, and a second wide angle element that provides a generally sideward and downward field of view to provide a view of the area immediately adjacent the vehicle so as to assist the driver in parking the vehicle), depending on the particular application of the mirror reflective element assembly.

In the illustrated embodiment, the reflective element assembly includes back plate 13 attached to the rear of the reflective element (such as via any suitable adhesive or the like), with the back plate being formed or configured to attach to a mirror actuator (not shown) for adjusting the reflective element to provide the desired or appropriate rearward field of view when the mirror assembly is mounted to the vehicle. The actuator may comprise an electronic actuator or manual actuator without affecting the scope of the present invention. In the illustrated embodiment of FIG. 2, back plate 13 includes an attaching portion 13a and a pocket or receiving portion 24 that is formed to receive auxiliary wide angle element 22 therein. The pocket 24 comprises an aperture 24a formed through the attaching portion 13a and sidewalls 24b extending rearward from the attaching portion and formed to substantially correspond with the peripheral edge of the wide angle element 22. The back plate 13 and pocket 24 may be unitarily formed together, such as via molding or injection molding of the back plate. Optionally, the back plate may utilize aspects of the back plates of the mirror assemblies described in U.S. patent application Ser. No. 12/187,725, filed Aug. 7, 2008, which is hereby incorporated herein by reference in its entirety.

In the illustrated embodiment, reflective element assembly 11 also includes a cover plate 26 that is attachable to the rear of the pocket 24 of back plate 13 such that the sidewalls 24b of pocket 24 and cover plate 26 substantially encase the auxiliary wide angle element 22 within the pocket 24. The cover plate 26 may readily attach to the sidewalls 24b of pocket 24, such as via snaps or tabs 26a for engaging corresponding connecting elements of sidewalls 24 to provide a snap type connection or the like. The cover plate 26 may press against the auxiliary wide angle element 22 to urge the auxiliary wide angle element toward and into engagement with the mirror substrate and thus may mechanically secure the auxiliary wide angle element to the mirror substrate when the cover plate 26 is snapped or otherwise attached to the sidewalls 24b of the pocket 24 of the back plate 13.

Optionally, and desirably, the reflective element assembly may include a heater element 28 that is disposed at or established at the rear surface of the reflective element 12 to reduce fogging of the reflective element. The heater pad or element at the rear surface of the glass substrate may provide an anti-fogging of de-fogging feature to the exterior mirror assembly, and may utilize aspects of the heater elements or pads described in U.S. Pat. No. 7,400,435, and/or U.S. patent application Ser. No. 12/187,725, filed Aug. 7, 2008, and/or U.S. provisional applications, Ser. No. 60/853,850, filed Oct. 24, 2006; Ser. No. 60/918,089, filed Mar. 15, 2007; and/or Ser. No. 60/970,687, filed Sep. 7, 2007, and/or PCT Application No. PCT/US07/82099, filed Oct. 22, 2007, which are hereby incorporated herein by reference in their entireties. Optionally, the reflective element assembly 11 may include a second or auxiliary heater element 30 for heating the rear surface of the auxiliary wide angle element 22 (such as between the rear surface of the auxiliary wide angle element and the cover plate 26 at the rear of pocket 24 of back plate 13), such as by utilizing aspects of the mirror assemblies described in U.S. patent application Ser. No. 12/187,725, filed Aug. 7, 2008, which is hereby incorporated herein by reference in its entirety.

Auxiliary wide angle element 22 comprises a glass lens or element that is adhered to or attached to or removably attached to the rear surface of the reflective element with an optical coupling layer or element 21 between the auxiliary wide angle element and the glass mirror substrate. Such a glass element or lens limits or substantially precludes bonding issues that may arise when a plastic or polymeric or polycarbonate lens is bonded to the glass substrate of the reflective element due to the differences in the thermal expansion coefficients of the two materials. Because an exterior rearview mirror assembly is subjected to extreme temperature variation and thermal shock and thermal cycling, it is desirable to select materials that have similar or substantially matching thermal coefficients of expansion, so that the materials can be bonded together (via a suitable optical adhesive that preferably has a similar thermal coefficient of expansion) and can withstand the extreme temperature and environmental variations encountered by an exterior rearview mirror assembly of a vehicle, such as by utilizing aspects of the mirror assemblies described in U.S. patent application Ser. No. 12/187,725, filed Aug. 7, 2008, which is hereby incorporated herein by reference in its entirety.

The optically clear coupling element or optical coupling layer 21 is disposed between the wide angle element 22 and the rear surface of the reflective element substrate to adhere or support or otherwise couple the wide angle element to the reflective element. The optical coupling layer may be selected to have good or enhanced optical transparency and clarity and to be substantially optically clear. Desirably, the optical coupling layer may have a refractive index that substantially matches or approximates the refractive index of the glass wide angle element and/or the glass mirror substrate (such as a refractive index of around 1.52 or thereabouts for mirror glass). For example, the optical coupling layer 21 may comprise an optical adhesive or polymer, such as, for example, a silicone, such as a silicone gel, such as Dow Corning 3-4118 or 3-4133 or Momentive (old GE silicone) 7000 series, a polyurethane, an optically clear TPE (thermoplastic elastomer), an optically clear TPU (thermoplastic polyurethane), an optically clear EPDM, a hot melt silicone, and/or the like. Optionally, and desirably, the selected optical coupling layer or elastomer may have a hardness (or softness) of less than about 20 shore "A" durometer hardness.

Optionally, the optical coupling layer may comprise a coupling layer or element that is dispensed on the auxiliary wide angle element and then cured. The auxiliary wide angle element and optical coupling layer combination or construction may then be mechanically held against the rear surface of the substrate of the mirror reflective element. Optionally, the optical coupling layer may be applied to the auxiliary wide angle element by various means, such as via injection molding or the like. The front surface of the optical coupling layer that comes into contact with the rear surface of the mirror reflective element desirably may have a clean and smooth surface. Such a desirable clean and smooth surface may be obtained by molding the optical coupling layer or element against a class "A" mold so as to reduce or limit imperfections in the surface of the optical coupling layer. Optionally, the thickness of the optical coupling layer may be a function of the mirror surface type (such as flat or planar vs. concave) and the softness/compression of the optical coupling layer. Optionally, the profile of the optical coupling layer may be curved with a higher or thicker center region to enhance the attachment process and reduce the chance of trapping air between the optical coupling layer and the rear surface of the substrate of the mirror reflective element during the assembly process.

With some silicones/polyurethanes and other elastomers with high water vapor transmission, it is possible to get a haze in the optical coupling layer. This haze is due to water vapor transmission into the optical coupling layer that can then condense once the product has been transferred from a high temperature/high humidity environment to a lower temperature/lower humidity environment. Although this process can be reversible, it may be desirable to either to choose materials with low water vapor transmission or use an edge encapsulant.

Thus, the optical coupling layer may be applied to the front surface of the auxiliary wide angle element, such as by injection molding, casting, dispensing, spin coating, dipping, compression molding (with thermoplastics), and/or the like. Such an application can be done directly on the auxiliary wide angle element or it can be done in a sheet form and then the individual optical coupling layers or elements may be die cut from the sheet and then post attached to the front surface of the auxiliary wide angle element.

The auxiliary wide angle element and optical coupling layer combination or construction may then be attached to the rear surface of the mirror reflective element. This can be done by a simple placement of the auxiliary wide angle element and optical coupling layer construction at the mirror substrate surface, either manually or by using a robot. During the attachment of the auxiliary wide angle element and optical coupling layer construction to the mirror substrate surface, care should be taken not to trap any air bubbles between the optical coupling layer and the mirror reflective element. Optionally, this process may be done via vacuum lamination (by bringing together the auxiliary wide angle element and optical coupling layer construction and the mirror reflective element in a vacuum chamber using a press). Optionally, the auxiliary wide angle element and optical coupling layer and mirror reflective element assembly or construction may be vacuum bagged after coupling to improve the wetting and to remove any trapped bubbles.

Thus, the auxiliary wide angle element and optical coupling layer of the present invention provides enhanced assembly processes and reduces waste of the mirror reflective elements during the manufacturing process. Typically, an auxiliary wide angle element is adhered to the mirror substrate with a low viscosity adhesive in order to attach and optically couple the auxiliary wide angle element to the mirror substrate. Use of such adhesives can lead to bubbles or voids or inclusions being formed between the auxiliary wide angle element and the mirror substrate (with such bubbles or imperfections being viewable and discernible to a person viewing the auxiliary wide angle element through the mirror substrate or substrates). Also, with such known adhesives, care is taken to limit the squeeze out or flowing outward of the adhesive around the perimeter regions of the auxiliary wide angle element when the auxiliary wide angle element is urged or pressed against the mirror substrate with the adhesive disposed therebetween.

The optical coupling layer 21 functions to at least temporarily hold the auxiliary wide angle element at the mirror substrate, and may be readily removed from the mirror substrate if any imperfections are found at the coupling between the auxiliary wide angle element and the mirror substrate. For example, the optical coupling layer may comprise a tacky front surface or the like that may be urged against the rear surface of the mirror substrate to temporarily hold the auxiliary wide angle element to the mirror substrate.

Optionally, and desirably, the optical coupling layer, such as a soft silicone (or other suitable material) optical coupling layer, may be disposed or established on the front surface of the auxiliary wide angle element, with a release liner or cover element at the front surface of the optical coupling layer. Thus, an operator at the mirror manufacturing plant can peel the release liner or cover element from the optical coupling layer to expose the front surface of the optical coupling layer, and the auxiliary wide angle element and optical coupling layer (with its clean and smooth outer or front surface exposed) can be moved into engagement or pressed against the surface of the glass substrate of the mirror reflective element. Optionally, the optical coupling layer may be formed to have a curved front surface so that the auxiliary wide angle element can be attached to a curved substrate of a mirror reflective element or to a curved windshield or the like.

Optionally, a PVB lamination process may be advantageous in attaching the auxiliary wide angle element to the mirror reflective element, since the step of attaching the auxiliary wide angle element to the mirror reflective element may then be pushed back upstream to the processing of the glass substrate and before the front substrate is attached to the rear substrate. This would be desirable due to the lower cost of the glass substrate compared to a complete electrochromic mirror reflective element. If the glass substrate alone is discarded, it would obviously be of lower cost than discarding a complete electrochromic mirror reflective element if the auxiliary wide angle element is attached to the mirror reflective element at the end of the assembly line.

After the auxiliary wide angle element is located at the rear surface of the mirror substrate, the auxiliary wide angle element may be examined or inspected (such as by an operator or inspector viewing the auxiliary wide angle element through the mirror substrate and optical coupling layer or through the mirror reflective element and optical coupling layer) to make sure that there are no imperfections at the auxiliary wide angle element—optical coupling layer—mirror substrate or reflective element interface that would lead to the scrapping of the mirror reflective element. If there are any unacceptable imperfections, the auxiliary wide angle element may be peeled from or removed from the mirror substrate and the mirror substrate (which may be part of a complete electrochromic reflective element) may be re-used. Thus, the optical coupling layer limits or substantially reduces waste of a completed electrochromic reflective element, which otherwise would have to be scrapped if an auxiliary wide angle element were permanently adhered thereto and imperfections existed between the auxiliary wide angle element and the mirror substrate.

After the auxiliary wide angle element is located at the mirror substrate (and optionally after inspection of the auxiliary wide angle element—optical coupling layer—mirror substrate(s) construction or assembly), the auxiliary wide angle element (which may be temporarily held at the mirror substrate by the optical coupling layer) may be secured to the mirror substrate via a long term or permanent attaching or securing means, such as by mechanical attachment means or such as by an adhesive disposed around the perimeter of the auxiliary wide angle element at the mirror substrate or by any other suitable attaching means or the like (and optionally, the optical coupling layer may set or cure to substantially permanently affix the auxiliary wide angle element to the mirror substrate). Thus, the long term or permanent securing of the wide angle element to the mirror substrate may be achieved secondary or in addition to temporary attachment of the wide angle element to the mirror substrate via the optical coupling layer or element. For example, the auxiliary wide angle element (with the optical coupling layer disposed or established thereat) may be mechanically held against the mirror using the mirror back plate. Optionally, for example, this can be done either by having a pocket or receiving portion in the back plate (such as by utilizing aspects of the mirror assemblies described in U.S. patent application Ser. No. 12/187,725, filed Aug. 7, 2008, which is hereby incorporated herein by reference in its entirety), or by having other means of applying a compressive force to the auxiliary wide angle element and against the mirror substrate surface. If the mirror reflective element assembly is of a frameless design, the compression may be provided by the coupling between the back plate and a heater pad, or if the mirror reflective element is a bezeled design, the compression may be provided by the bezel. Optionally, the auxiliary wide angle element (with optical coupling layer) may be tacked on to the mirror substrate using an adhesive, such as, for example, a UV curable adhesive or the like, that would either replace the mechanical hold provided by, for example, the back plate, or that may complement the mechanical attachment.

Thus, the present invention provides for enhanced assembly of an auxiliary wide angle element to a glass mirror substrate by providing a mechanical coupling of the auxiliary wide angle element to the rear surface of the glass substrate of the mirror reflective element, and thus may significantly simplify the manufacturing process. This is because a concern with auxiliary wide angle elements on electro-optic or electrochromic mirror reflective elements is that one may have to discard or throw away a good reflective element if there is an issue with the auxiliary wide angle elements attached or affixed or adhered thereto, which may add significantly to the overall cost of the products. By using an elastomeric optical coupling layer such as described above, the auxiliary wide angle element may be readily removed if there were a concern with the auxiliary wide angle element or the optical coupling layer. For example, the reflective element may be viewed by an operator or inspector at the manufacturing facility after the auxiliary wide angle element and optical coupling layer are located at the rear surface of the mirror substrate or mirror reflective element (where the operator or inspector may view the curved reflector of the auxiliary wide angle element through the mirror substrate or reflective element and through the optical coupling layer in a similar way that a person may view the mirror when it is fully assembled and normally mounted on a vehicle), in order to determine that there are no unacceptable imperfections at the auxiliary wide angle element. If any unacceptable imperfections are found, the auxiliary wide angle element may be removed from the reflective element and the reflective element may be re-used. Also, because the optical coupling layer comprises a molded layer disposed at the front surface of the auxiliary wide angle element, there would be less concerns with squeeze out or with using a dam seal as it is currently used on known mirror constructions that utilize known liquid adhesives.

As discussed above, the optical coupling layer may include a removable liner or cover sheet that allows the operator to remove or peel the cover sheet from the front surface of the optical coupling layer (which may be molded to or adhered to or otherwise affixed to the front surface of the auxiliary wide angle element) and stick the now exposed, tacky surface of the optical coupling layer to the rear surface of the mirror substrate or reflective element. An advantage of such a "peel and stick" process is that the mirror reflective element and/or the auxiliary wide angle element can be salvaged should any cosmetic issues arise during the assembly process. The electro-optic reflective element is typically quite expensive at final assembly and it would be advantageous if good reflective elements are not thrown away due to bubbles, lint and/or other cosmetic or alignment issues associated with the auxiliary wide angle element and/or optical coupling layer. Other advantages to using a preformed soft elastomer or optical coupling layer on the auxiliary wide angle element include the ability to make the bond gap between the auxiliary wide angle element and the mirror reflective element more consistent (such as compared to use of viscous adhesives). This can be important in order to maintain the aim of the auxiliary wide angle element so as to provide the desired wide angle field of view to the driver of the vehicle when viewing the reflective element of the rearview mirror. When using a known liquid adhesive, it is typically difficult to maintain a repeatable bond-line due to the relatively higher viscosity of typical adhesives and due to variations in the amount of adhesive disposed between the auxiliary wide angle element and the mirror substrate. Also, the use of a preformed soft elastomer would eliminate or limit the need for a "darn" seal as may be desired in other constructions to ensure that the adhesive does not get onto the front surface of the mirror reflective element.

The prior known methods and processes of adhesively applying an auxiliary wide angle element to a mirror reflective element typically result in a more permanent attachment of the auxiliary wide angle element to the mirror reflective element. Although it may be possible to peel away or otherwise remove the auxiliary wide angle element with some of the known adhesive materials and methods, it would not be a cost effective process in production to remove an adhered or bonded auxiliary wide angle element. There is also a chance of damaging the mirror reflective element and/or the auxiliary wide angle element. Since an electrochromic mirror reflective element is, relatively speaking, expensive (as compared to the cost of an auxiliary wide angle element), it would be desirable to be able to remove the auxiliary wide angle element for any quality issues related to the auxiliary wide angle element and the attachment process. Once the auxiliary wide angle element is removed, the EC mirror reflective element and possibly the auxiliary wide angle element can then be re-used.

Thus, in the "peel and stick" process of the present invention, the auxiliary wide angle element may be attached to the mirror reflective element in a fashion that it can be readily removed. This is because the attachment is an optical contact and not a permanent adhesive contact. With such an optical contact, the auxiliary wide angle element can be readily removed without damaging the mirror reflective element. Optionally, after inspection confirms that there are no unacceptable imperfections at the interface between the auxiliary wide angle element and the optical coupling layer or between the optical coupling layer and the mirror substrate or mirror reflective element, the auxiliary wide angle element may be more permanently attached to the mirror substrate or reflective element, such as discussed above.

Optionally, a substantially light absorbing opacifying border, such as a dark color or darkened or black border, may be provided around the perimeter of the auxiliary wide angle element, such as at the front surface and perimeter edge region of the wide angle element (or optionally on the glass substrate of the reflective element) to provide a demarcation or delineation line so as to demarcate or distinguish the wide angle reflector portion from the primary reflector portion of the reflective element. The dark border may be disposed or established at the front surface and perimeter edge region of the wide angle element, and may coat or cover the perimeter edges of the auxiliary wide angle element. Optionally, a demarcating element may be disposed at the rear of the reflective element to demarcate the auxiliary wide angle element. Optionally, the demarcating element may include or comprise an illumination source to draw the driver's attention to the auxiliary wide angle element, such as in response to a detection of a vehicle or object in the "blind spot" at that side of the vehicle, such as by utilizing aspects of the mirror assemblies described in U.S. patent application Ser. No. 12/187,725, filed Aug. 7, 2008, which is hereby incorporated herein by reference in its entirety.

Optionally, a mirror reflective element assembly may include a reflective element (such as an electro-optic or electrochromic reflective element or a single substrate reflective element) and an auxiliary wide angle element with an opaque gasket element or dark gasket or perimeter element disposed at the front perimeter regions of the wide angle element and between the wide angle element and the reflective element. The gasket element may function in a similar manner as the optical coupling layer discussed above, but would only be disposed at the perimeter regions (such as about a 2 mm band around the perimeter of the front surface) of the auxiliary wide angle element and would be opaque, such as a darkened color or black or the like. Thus, in such an embodiment, there may not be any adhesive disposed between the auxiliary wide angle element and the mirror substrate. As a result, such an embodiment would reduce the failure modes and scrap rate of mirror reflective elements that use a liquid adhesive to adhere or bond the auxiliary wide angle element to the mirror substrate.

The perimeter dark-colored gasket element may comprise any suitable material, such as, for example, a reactive material, such as a B-staged epoxy such as the types available from TechFilm, or a black PET with a double sided adhesive, such as an adhesive like those available from Griff Paper and Film (and optionally where the adhesive layer may comprise a B-staged epoxy), or any other suitable adhesive or gasket material or the like. Optionally, for example, the gasket may comprise a pre-reacted adhesive, such as a double-sided pressure sensitive adhesive (PSA) tape or the like. Optionally, for example, the gasket may comprise a known gasket-type material (as may be used for other gasket-type applications), such as a butyl rubber or other types of gasket materials or the like. Optionally, the auxiliary wide angle element may be more permanently held or secured in place via a suitable mechanical means or adhesive means, such as via the back plate or via tacking or adhering or bonding the wide angle element in place at the rear of the mirror substrate using a suitable adhesive, such as a UV curable adhesive or the like, such as in a similar manner as discussed above.

Although use of such a gasket element does not optically couple the front surface of the wide angle element to the rear surface of the mirror substrate and thus would result in the wide angle element being spaced from the rear surface of the mirror substrate (such as in a similar manner as a double pane window or an electrochromic reflective element or cell), and thus in theory would yield more reflections at the glass/air interfaces, in practice the spacing between the front surface of the wide angle element and the rear surface of the mirror substrate is very small so that any multiple images or reflections that may occur would be very closely spaced apart and would not be readily resolved or discerned by a person viewing the wide angle element through the mirror reflective element. Optionally, the space or cavity between the wide angle element and the mirror substrate (and bound by the perimeter gasket element) may be filled with an optically coupling material, such as a low viscosity resin or the like (such as a substantially optically clear or transparent resin and such as a resin that has, a refractive index that matches or substantially matches the refractive index of the mirror substrate and/or wide angle element). Optionally, for example, the optically coupling material or low viscosity resin (such as a UV curable optical adhesive or the like) may be injected through a fill port in the gasket element after the wide angle element and gasket element are urged toward and into engagement with the mirror substrate. Such a resin material thus may function to fill the cavity between the wide angle element and mirror substrate (that is bound by the gasket around the perimeter regions of the wide angle element) to optically couple the wide angle element to the mirror substrate, and may also or otherwise function to adhesively attach the wide angle element to the mirror substrate. Optionally, the wide angle element—mirror substrate coupling may be treated, such as in a similar manner as may be done for the coupling of the front and rear substrates during construction of an electrochromic mirror reflective element.

Thus, the gasket element of the present invention may function in a similar manner as the optical coupling layer, discussed above, and may at least temporarily hold the auxiliary wide angle element at the rear surface of the mirror substrate. Optionally, the gasket element may be molded onto the perimeter regions of the front surface of the wide angle element (and optionally over the side perimeter edges of the wide angle element and the rear surface of the wide angle element), and may be molded or formed to have a substantially smooth and flat front surface for engaging the rear surface of the glass mirror substrate. Optionally, the gasket element may have a peel-away cover at its front surface so an operator may readily peel off the cover to expose the smooth and flat surface (and optionally tacky surface) of the gasket before urging the wide angle element against the rear surface of the mirror substrate, such as in a similar manner as discussed above. Also, the gasket element may allow for temporary holding of the wide angle element against the mirror substrate, whereby the wide angle element—mirror substrate construction or assembly can by inspected for imperfections before completion of the mirror assembly, and the wide angle element may be readily removed from the mirror substrate or mirror reflective element if imperfections in the wide angle element—mirror substrate interface are found, and without having to scrap the complete reflective element. The opaque gasket element also provides the function of covering the cut or ground perimeter edges of the wide angle element to enhance the appearance of the wide angle element as it is viewed through the mirror reflective element.

Optionally, the mirror assembly and/or mirror reflective element assembly or sub-assembly may include a back plate that includes a perimeter framing portion or bezel portion that extends around the perimeter edges of the reflective element to support the reflective element and frame the reflective element at the mirror assembly (such as by utilizing aspects of the mirror assemblies described in U.S. patent application Ser. No. 11/520,193, filed Sep. 13, 2006, now U.S. Pat. No. 7,581,859, which is hereby incorporated herein by reference in its entirety). The perimeter bezel portion may be narrow or small depending on the particular application of the reflective element and mirror reflective element sub-assembly. Optionally, the mirror reflective element sub-assembly may comprise a bezelless or frameless reflective element (such as the types described in U.S. Pat. No. 7,184,190; and/or U.S. patent application Ser. No. 11/226,628, filed Sep. 14, 2005; and/or Ser. No. 11/021,065, filed Dec. 23, 2004, now U.S. Pat. No. 7,255,451, and/or PCT Application No. PCT/US2006/018567, filed May 15, 2006 by Donnelly Corp. et al. and published Nov. 23, 2006 as International Publication No. WO 2006/124682, which are hereby incorporated herein by reference in their entireties), whereby the back plate may not include a perimeter framing portion or bezel portion around the perimeter of the reflective element.

Typically, a mirror reflective element is recessed within the mirror casing of the exterior mirror assembly and, thus, the outboard wall of the mirror casing is reflected by the reflective element (and particularly may be reflected by an auxiliary wide angle element or portion of the reflective element) toward the driver of the vehicle, such that the driver's field of view, when viewing the mirror reflective element, encompasses the reflection of the mirror casing at the outboard portion of the reflective element. Optionally, the mirror casing and/or back plate and/or mounting structure of the reflective element and auxiliary wide angle element may be adjusted or configured to provide an enhanced field of view to the driver when viewing the wide angle element, in order to reduce or eliminate reflection of the mirror casing toward the driver viewing the reflective element and auxiliary wide angle element. For example, the casing may be adapted or the main reflective element and auxiliary wide angle element may be disposed rearward (with respect to the direction of travel of the vehicle) and toward the rearward perimeter edge of the mirror casing so that the outer surface of the reflective element is at or near or flush with the rearward perimeter edge of the mirror casing, whereby the rearward perimeter edge of the mirror casing has a reduced overhang at or is generally flush with the reflective element and wide angle element. Thus, the driver's field of view, when viewing the reflective element and auxiliary wide angle element, does not encompass a reflection of the outboard wall of the mirror casing (which may otherwise be viewed as a reflection at the wide angle element by a driver viewing the auxiliary wide angle portion of the reflective element if the reflective element is disposed within or recessed within the mirror casing). Optionally, for example, the prescription of the wide angle element may be configured so that the field of view of the driver when viewing the wide angle element does not encompass the mirror casing, such as by providing a reflective surface having a larger radius of curvature or the like.

Figure 3:
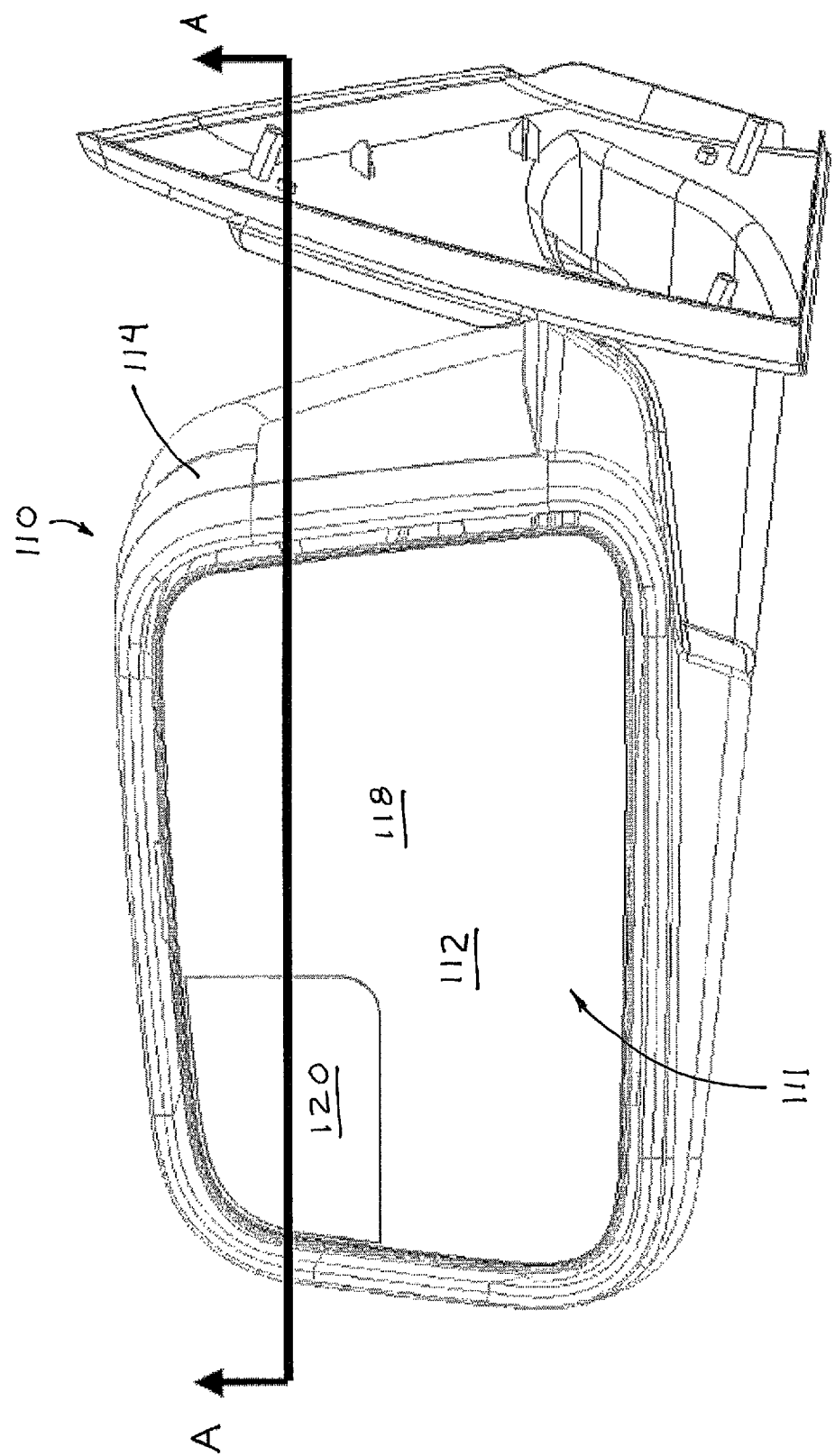
FIG. 3 is a front elevation of another exterior rearview mirror assembly incorporating an auxiliary wide angle element in accordance with the present invention.
Figure 3A:
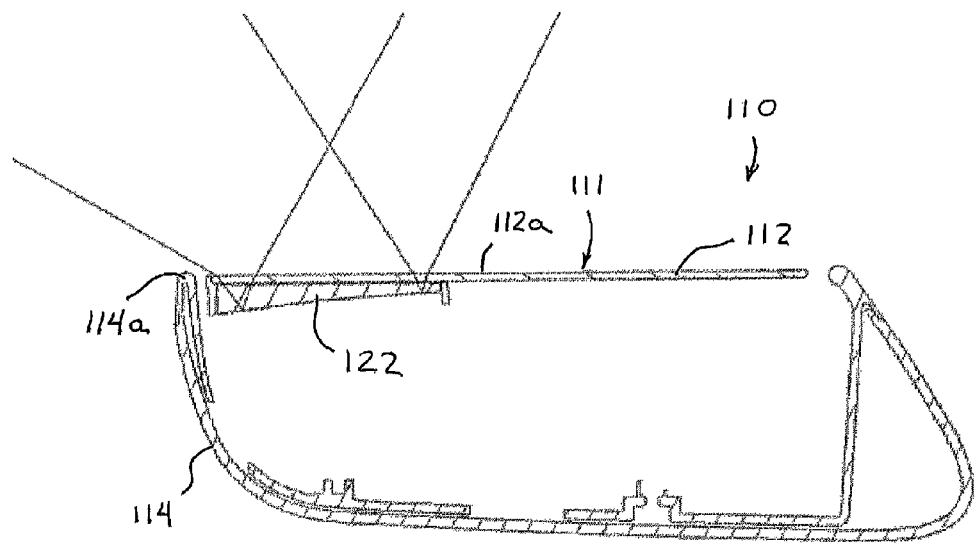
FIG. 3A is a sectional view of the exterior rearview mirror assembly taken along the line A-A in FIG. 3.

For example, and with reference to FIGS. 3 and 3A, an exterior rearview mirror assembly 110 for a vehicle includes a mirror reflective element assembly 111 having a mirror reflective element 112 attached to a back plate or mounting plate and received in and/or supported by a mirror shell or casing 114. Mirror reflective element 112 provides a first or principal or main viewing mirror reflective element portion 118 and a second or auxiliary or wide angle reflective element portion 120. Reflective element assembly 111 includes an auxiliary wide angle element or wide angle reflective element or reflective optic or lens 122 established behind and at or near the wide angle portion 120 of the mirror reflective element 112 to provide an auxiliary or wide angle "spotter" mirror or blindzone mirror at the reflective element, such as in a similar manner as described above.

As shown in FIG. 3A, the reflective element assembly 111 may be moved rearward (relative to the direction of travel of the vehicle to which the mirror assembly is mounted) so that the surface 112a of the reflective element 112 is generally at or flush with the rearward perimeter edge 114a of mirror casing 114. As can be seen with reference to FIGS. 3A and 3B, such a reflective element—mirror casing configuration provides an enhanced field of view to the driver of the vehicle when viewing the wide angle element 122. For example, when a reflective element 112' of a mirror assembly 110' (FIG. 3B) is disposed at a casing 114' in a known or typical manner (with the reflective element set back in the mirror casing such as shown in FIG. 3B), the outermost portion or outboard portion of the field of view of a driver of the vehicle when viewing a wide angle element 122' is partially blocked or interfered with by the outer wall or edge 114a' of the mirror casing 114', while the reflective element—mirror casing configuration of the mirror assembly 110 (FIG. 3A) provides an enhanced field of view to the driver of the vehicle because the outboard and rearward edge 114a of the mirror casing 114 does not interfere with the field of view of the driver when viewing the wide angle element.

Figure 3B:
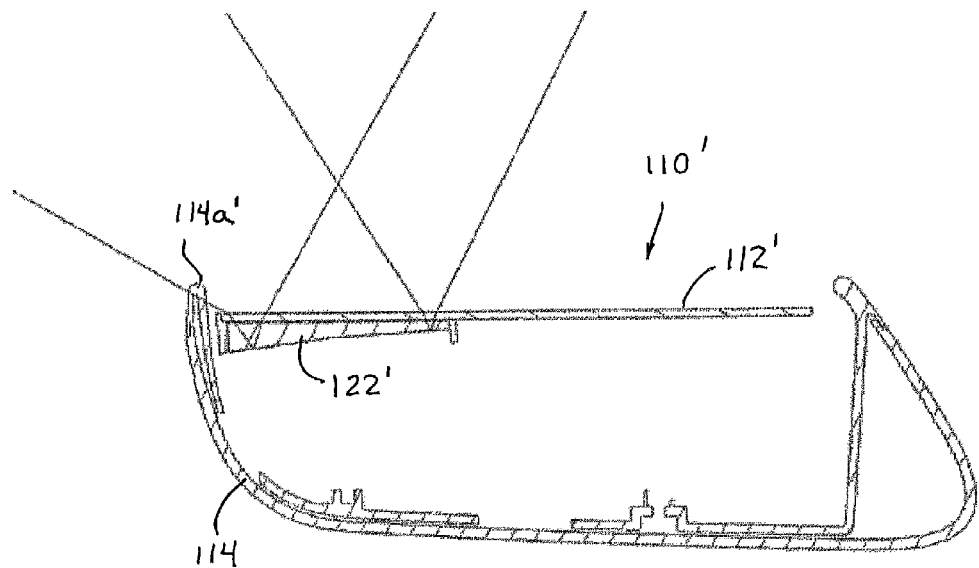
FIG. 3B is a sectional view similar to the view of FIG. 3A, but showing an exterior rearview mirror assembly with the reflective element set back in the casing in a know manner.

Optionally, the reflective element assembly 111 may be mounted to a mounting structure within the mirror casing that supports the reflective element assembly 111 further rearward as compared to the reflective element assembly 111' of FIG. 3B, in order to position the wide angle element relative to the casing to provide the desired or enhanced field of view. Optionally, the mirror casing may be adjusted or configured so as to not extend rearward beyond the reflective element, such that the reflective element may be normally mounted within the modified or adjusted mirror casing. Optionally, the wide angle element may be configured to provide such an enhanced field of view by adjusting the radius of curvature of its reflector surface so that light reflecting off the wide angle element for viewing by the driver does not interfere with the mirror casing. For example, the radius of curvature of the wide angle element may be larger (so that the reflector surface of the wide angle element is flatter) to limit interference by the mirror casing with the driver's wide angle field of view (or to limit or eliminate a reflection of the mirror casing at the auxiliary wide angle reflective portion of the reflective element and toward the driver of the vehicle to which the mirror assembly is mounted), or the origin of the radius of curvature of the wide angle element may be moved outboard to adjust the curvature in a manner that also limits interference by the mirror casing with the driver's wide angle field of view. Other adjustments or configurations of the wide angle element and/or the mirror casing may be implemented to reduce interference effects by the mirror casing with the field of view (such as the outboard or outermost portion of the field of view) of a driver viewing the wide angle element, while remaining within the spirit and scope of the present invention.

Figure 4:
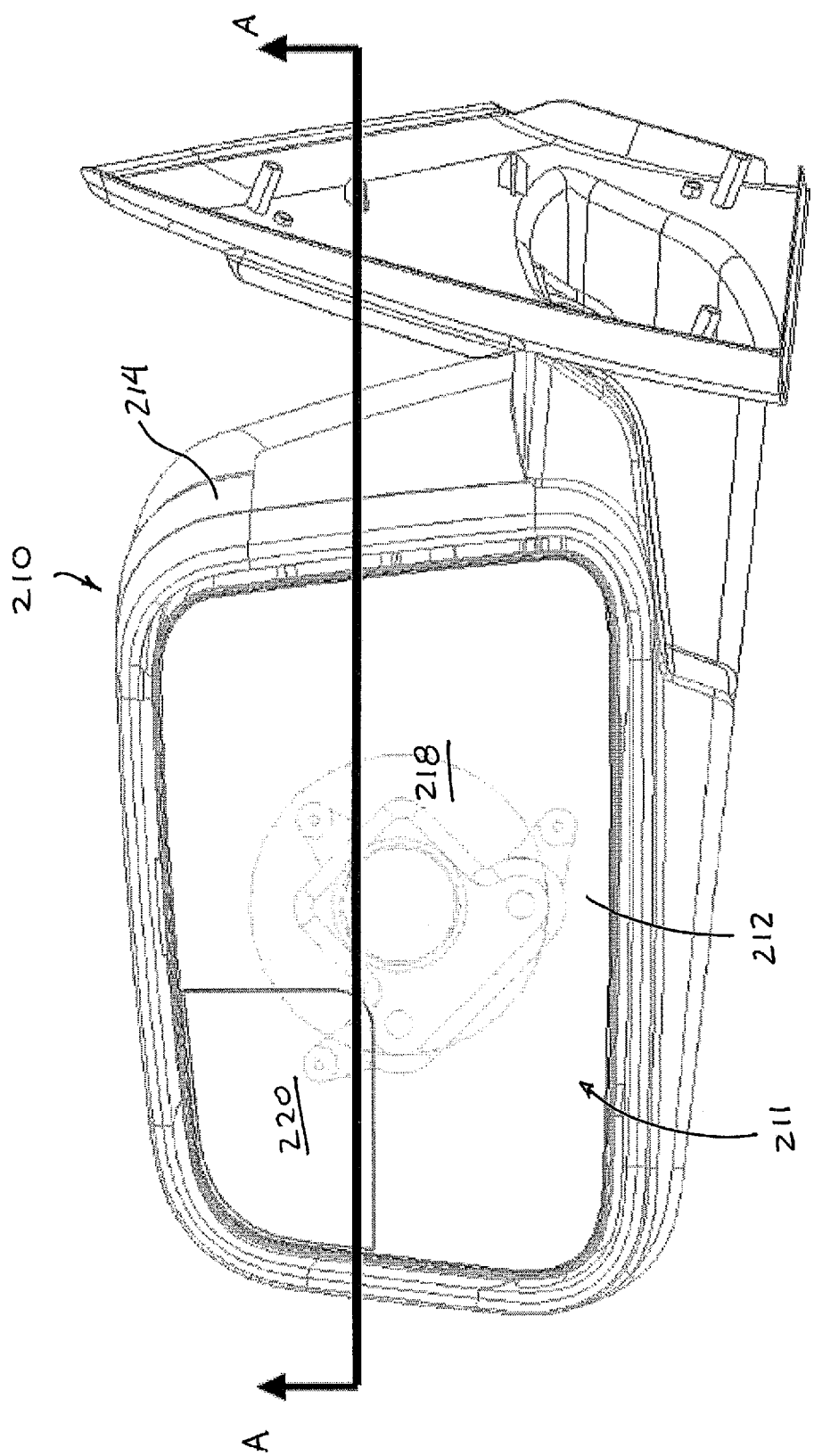
FIG. 4 is a front elevation of another exterior rearview mirror assembly incorporating an auxiliary wide angle element in accordance with the present invention.

Optionally, the mounting structure of the back plate may be configured to space the reflective element rearward (with respect to the direction of travel of the vehicle to which the mirror assembly is mounted) to provide the enhanced field of view, and may also accommodate the wide angle element at the mounting location of the mirror actuator. For example, and with respect to FIGS. 4 and 4A, an exterior rearview mirror assembly 210 for a vehicle includes a mirror reflective element assembly 211 having a mirror reflective element 212 attached to a back plate or mounting plate 213 and received in and/or supported by a mirror shell or casing 214. Mirror reflective element 212 provides a first or principal or main viewing mirror reflective element portion 218 and a second or auxiliary or wide angle reflective element portion 220. Reflective element assembly 211 includes an auxiliary wide angle element or wide angle reflective element or reflective optic or lens 222 established behind and at or near the wide angle portion 220 of the mirror reflective element 212 to provide an auxiliary or wide angle "spotter" mirror at the reflective element, such as in a similar manner as described above. The back plate 213 is configured to mount the reflective element assembly 211 to the mirror actuator 232 while allowing clearance between the actuator mounting structure and the inboard or more centrally located region of the wide angle element 222.

Figure 4A:
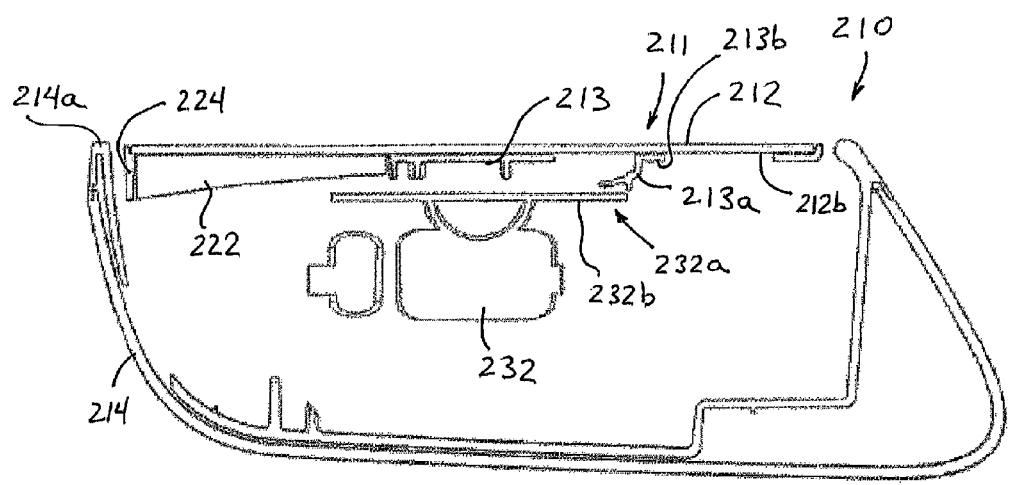
FIG. 4A is a sectional view of the exterior rearview mirror assembly taken along the line A-A in FIG. 4.
Figure 5:
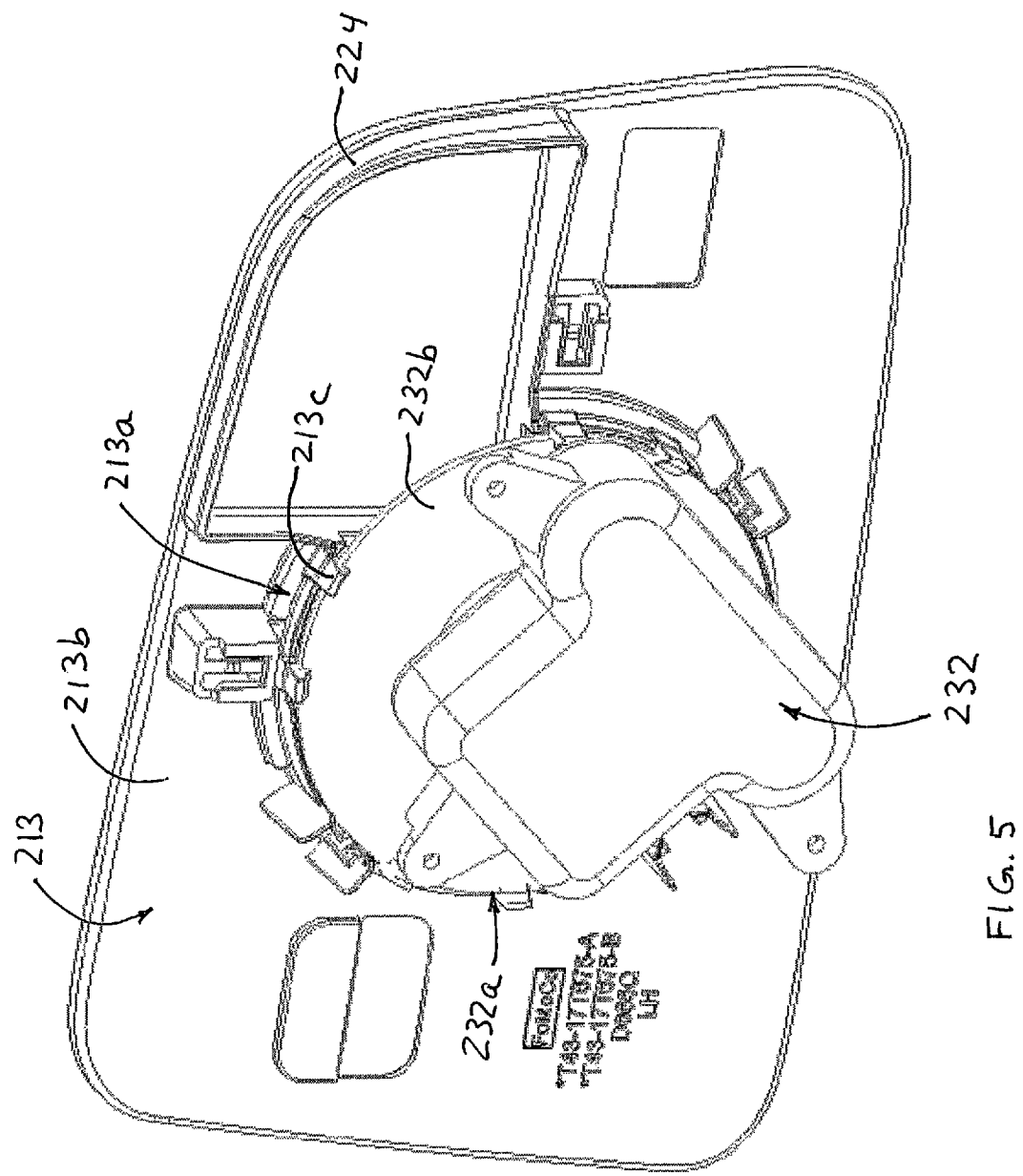
FIG. 5 is a rear perspective view of a reflective element assembly and back plate and actuator of the rearview mirror assembly of FIG. 4.

In the illustrated embodiment, the back plate 213 includes mounting structure 213a for mounting the back plate 213 and reflective element assembly 211 to the mirror actuator 232. As can be seen in FIG. 4A, the mounting structure 213a may extend from the generally planar portion 213b of back plate 213 at rear surface 212b of reflective element 212 to space the rear surface 212b of the reflective element 212 from the mirror actuator 232. In the illustrated embodiment, the mounting structure 213a of the back plate 213 includes a plurality of extended mounting arms 213c that extend from the generally planar portion 213b of back plate 213 and that attach to the mounting structure 232a of the mirror actuator 232 (such as via snapping arms 213c to a mounting plate 232b of mirror actuator 232 as shown in FIG. 5) to mount the reflective element assembly to the mirror actuator mounting structure. As can also be seen in FIGS. 4A and 5, the enhanced or enlarged spacing between the actuator and the reflective element 212 (as provided by the extended mounting structure) allows for a portion of the wide angle element 222 to be received within the pocket 224 of back plate 213 and between the reflective element and the actuator 232.

Figure 4B:
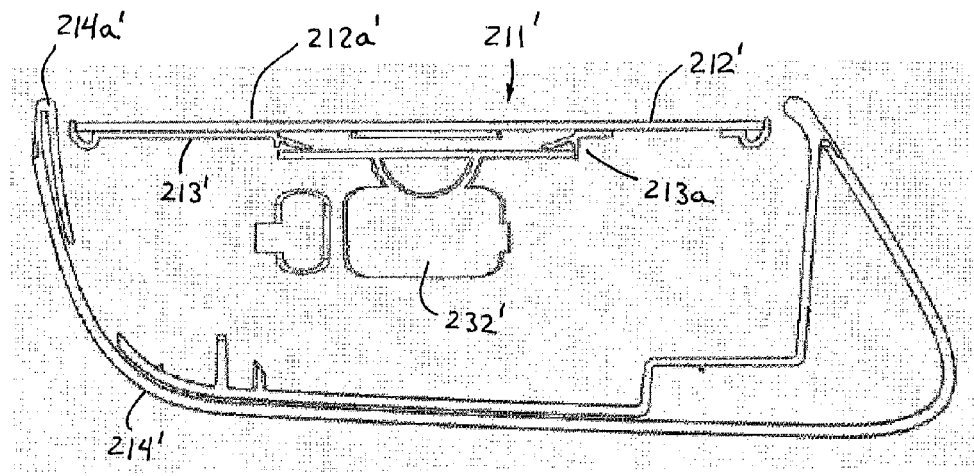
FIG. 4B is a sectional view similar to the view of FIG. 4A, but showing an exterior rearview mirror assembly with a reflective element mounted to an actuator in a known manner.

Thus, the reflective element 212 may be located at or flush with the rear edge 214a of the mirror casing 214 and/or the wide angle element 222 may extend inboard to a location that may otherwise interfere with the mounting of the reflective element assembly to the mirror actuator. For example, and as shown in FIG. 4B, a conventional mounting structure 213a' of a back plate 213' of a reflective element assembly 211' mounts to the mirror actuator 232' in such a manner that there would not be space between the mirror actuator and the back plate that would be sufficient to receive a portion of a wide angle element. As also shown in FIG. 4B, such a conventional mounting arrangement results in the surface 212a' of the reflective element 212' being received within the mirror casing 214' and inward of the perimeter edge 214a' of the mirror casing 214'.

Thus, the reflective element assembly and mounting structures such as discussed above provide a space or gap in which the inboard portion of the wide angle element may be disposed or tucked. The back plate may be attached to the mirror actuator and the wide angle element may be inserted into the pocket and slipped under the actuator so that at least a portion of the auxiliary wide angle element is disposed between the mirror actuator and the rear surface of the mirror reflective element. Optionally, the mounting structure may be configured to uniformly space the mounting structure or plate of the actuator from the mirror reflective element (such as shown in FIG. 4A), or the mounting structure may be angled so as to provide a larger gap or space at one side or area (such as where the wide angle element is to be received or disposed) and a smaller or reduced gap at the other side (it is envisioned that adjustment of the mirror actuator would account for such an angled configuration so that the reflective element could still be set to the desired angle or orientation relative to the mirror casing). Such a mounting structure also may allow a reflective element with an auxiliary wide angle element to be optionally mounted to an actuator of an exterior mirror, with the actuator and mirror casing of the exterior mirror providing common actuators and common mirror casings for mirrors having reflective elements with or without the auxiliary wide angle element.

Optionally, the reflective element assembly may include an auxiliary wide angle mirror element that is adhered to a rear surface of the reflective element, such as via an optical adhesive (such as by utilizing aspects of the mirror assemblies and adhesives described in U.S. Pat. Nos. 5,073,012; 5,115,346; 5,355,245; 5,523,877; and/or 7,338,177; and/or U.S. patent application Ser. No. 10/603,518, filed Jun. 25, 2003, and published Jan. 8, 2004 as U.S. Patent Publication No. US 2004/0004605; and/or Ser. No. 12/187,725, filed Aug. 7, 2008, which are hereby incorporated herein by reference in their entireties). When the wide angle element is adhered to the rear surface of the reflective element, excess optical adhesive may flow from between the wide angle element and the reflective element and may flow between the back plate and the reflective element at or around the perimeter edge regions of the wide angle element. If adhesive flows between the back plate and the reflective element, the adhesive may be visibly noticeable around the wide angle element and may adversely affect the appearance of the mirror reflective element assembly, leading to increased scrapping of the relatively expensive reflective elements (this is particularly concerning for applications with electro-optic or electrochromic reflective elements). Thus, in order to limit intrusion of the adhesive between the back plate and the rear surface of the reflective element (such as at a perimeter region around or at least partially around the wide angle element), the back plate may include a wiper seal (such as a flexible portion or element of the back plate) that extends or protrudes towards the reflective element and engages the rear surface of the reflective element and at least partially or substantially seals against the reflective element when the reflective element is attached to or adhered to the back plate. The wiper seal may be integrally molded or formed with the back plate and may be formed during the molding process that molds or forms the back plate, and thus may be an extension of the back plate that may engage the reflective element as the back plate is moved towards and attached to the reflective element.

Optionally, the reflective element may comprise an electro-optic reflective element (such as an electrochromic reflective element) and may have the rear substrate cut away or formed to accommodate the wide angle element so that the wide angle element is disposed at the cut-away region and has its forward face at and adhered to the rear surface of the front substrate (such as by utilizing aspects of the mirror assemblies described in U.S. patent application Ser. No. 12/187,725, filed Aug. 7, 2008, which is hereby incorporated herein by reference in its entirety). Thus, the wide angle element may be disposed at a cutaway region and rearward of the front substrate and adjacent to the electrochromic medium and rear substrate, such that the mirror reflective element assembly does not provide a dimming function at the wide angle reflecting region. In such an application, the wiper seal may engage the rear surface of the front substrate about the perimeter region of the wide angle element to limit or substantially preclude flow of adhesive between the back plate and the rear surface of the front substrate at the perimeter regions of the wide angle element. Optionally, however, a wide angle element may be disposed at the rear of a rear substrate of an electro-optic reflective element (such as an electrochromic reflective element) so as to be disposed at a dimmable region of the reflective element, whereby a wiper seal may be provided at and may engage with and seal against the rear surface of the rear substrate, depending on the particular application and desired functionality of the mirror reflective element assembly.

For example, and with reference to FIGS. 6-8, an exterior rearview mirror reflective element assembly 311 may include a wide angle reflective element 322 disposed at the rear of a front substrate 312*a* of an electrochromic reflective element 312 of the mirror reflective element assembly 311. The electrochromic reflective element 312 includes the front substrate 312*a* and a rear substrate 312*b*, with an electrochromic medium sandwiched between the front and rear substrates and at a principal reflecting region 318 of the reflective element 312. In the illustrated embodiment, and as shown in FIGS. 7 and 8, the rear substrate 312*b* is cut away or formed to accommodate the wide angle element 322 so that the wide angle element 322 is disposed at the cut-away region or wide angle reflecting region 320 and has its forward face 322*a* at the rear surface of the front substrate 312*a*.

Optionally, and desirably, the wide angle element may include a darkened coating or layer or element around its perimeter side edges and over its rear surface, such as by utilizing aspects of the mirror assemblies described in U.S. patent application Ser. No. 12/187,725, filed Aug. 7, 2008, which is hereby incorporated herein by reference in its entirety. For example, the darkened coating or layer or element may be disposed in a manner that has a portion that partially overlaps a perimeter region of the front or generally planar surface 322*a* of the wide angle optic or element 322 so as to provide a darkened frame element that is viewable around the perimeter of the wide angle element. Thus, for example, the front surface, with the exception of the perimeter edge regions, may be masked and the perimeter edge regions of the front surface and the side edges and the rear surface of the wide angle element may be coated or painted. The darkened coating or layer may thus provide a frame around the wide angle element and may also enhance the ability of the person viewing the mirror to recognize or appreciate the depth of the wide angle element and to enhance the appearance of the mirror reflective element assembly. The darkened layer or element may comprise any suitable layer or coating or paint or ink or element, such as a black coating or paint or ink coated or deposited over the curved rear surface of the wide angle optic, the side perimeter edges of the wide angle optic and partially overlapping the perimeter regions of the front generally planar surface of the wide angle optic.

As can be seen in FIGS. 7 and 8, the reflective element 312 is attached to a back plate 313, which has a generally planar portion 313*a* adhered to the rear of the reflective element (such as at the rear surface of the rear substrate) and a pocket or receiving portion 313b established for receiving or at least partially receiving the wide angle, element 322 therein. As shown in FIGS. 7, 7A, 8 and 8A, back plate 313 includes a wiper seal 315 established around or at least partially around a perimeter region of the pocket portion 313b. In the illustrated embodiment, the pocket portion 313b of back plate 313 includes an outer perimeter region 313c (that extends around the outboard perimeter region of wide angle element 322, such as at the upper outboard corner of the reflective element when it is normally mounted to a vehicle) and an inner perimeter region 313d (that extends around the inboard perimeter region of the wide angle element and that separates or demarcates the wide angle element from the principal reflecting region 318 of the reflective element. Optionally, and desirably, the wiper seal 315 may be integrally molded with the back plate 313 (and thus may comprise the same material as the back plate, such as, for example, a plastic or polymeric material or resin, such as ABS, polypropylene or polycarbonate ABS or any other suitable material) and may be molded or formed during the molding process (such as an injection molding process) that molds or forms the back plate.

Optionally, however, the wiper seal may be provided as a separate element that is disposed between or at the interface of the back plate and the rear surface of the reflective element. For example, the back plate may include a channel or attachment element or portion established around the perimeter of the wide angle element receiving portion, and a separate wiper element may be provided and attached to or partially received in or at the back plate so as to be disposed at the interface of the back plate and rear surface of the reflective element when the back plate is attached to the reflective element. Such a separate or additional seal may function in a similar manner as the integrally formed wiper seal, but may be less desirable because it would require a separate attachment or manufacturing step.

Wiper seal 315 comprises a flexible element or rib or lip that, in the illustrated embodiment, engages the rear surface of the front substrate around substantially the entire perimeter of the wide angle element. Wiper seal 315 comprises an outboard flexible lip or sealing element 315a that engages and substantially seals against the rear surface of the outer perimeter edge region (such as at the upper outboard corner) of the front substrate, and an inboard flexible lip or sealing element 315b that engages and substantially seals against the rear surface of the front substrate around or along the inboard perimeter region of the wide angle element. The outboard flexible lip 315a extends around the outer or outboard perimeter edge region 322b (FIG. 6) of the wide angle element 322, while the inboard flexible lip 315b extends around the inner or inboard perimeter edge region 322c of wide angle element 322, and the wiper seal may include transition regions at the corners or junctions between the outboard seal and the inboard seal.

In the illustrated embodiment, outboard wiper seal 315a comprises a flexible tab or lip that is integrally molded with the back plate and that flexes when pressed against the rear surface of the perimeter edge region of the front substrate. The outboard wiper seal 315a may be formed to protrude or extend generally along the rear surface of the substrate or toward the front substrate 312a (upward in FIGS. 7 and 8) or partially away from the substrate (downward in FIGS. 7 and 8), so that when the back plate 313 is adhered to reflective element 312, the outboard wiper seal 315a flexes as it engages the front substrate 312a and as the front substrate is pressed against the wiper seal and back plate to substantially seal against the rear surface of the outboard perimeter edge region of the front substrate when the reflective element is seated against and adhered to the back plate. Inboard wiper seal 315b may be formed to protrude or extend generally along the rear surface of the substrate or toward the front substrate 312a (upward in FIGS. 7 and 8) so that when the back plate 313 is adhered to reflective element 312, the inboard wiper seal 315b flexes as it engages the front substrate 312a to substantially seal against the rear surface of the region of the front substrate around the inboard perimeter edge region of the wide angle element when the reflective element is seated against and adhered to the back plate.

As can be seen in FIGS. 7A and 8A, outboard wiper seal 315a extends inboard from the outer perimeter border region 313c of the back plate 313, with its inboard end being spaced from the outboard perimeter edge of the wide angle element 322 when the wide angle element is received in pocket portion 313b of back plate 313. Outboard wiper seal 315a flexes as the reflective element is attached to the back plate and engages and seals against the perimeter edge region of the rear surface of the front substrate of the reflective element. The outboard wiper seal 315a may be formed with a relatively thin cross section and may have a thin section or weakened section to enhance flexing, such as via a living hinge configuration or the like. In the illustrated embodiment, the outboard wiper seal 315a engages the ground or rounded perimeter edge region 312c of the front substrate 312a to limit or substantially preclude adhesive intrusion between the wiper seal and the rear perimeter edge region of the reflective element. As shown in FIGS. 7A and 8A, when the outboard wiper seal 315a is seated against the front substrate, the wiper seal 315a flexes so that it may extend or protrude partially rearward away from the front substrate.

Likewise, and as can be seen in FIGS. 7A and 8A, inboard wiper seal 315b extends inboard from the inboard border region 313d of the pocket portion 313b of back plate 313, with its end being spaced from the inboard perimeter edge of the wide angle element 322 when the wide angle element is received in pocket portion 313b of back plate 313. The inboard wiper seal 315b may be formed with a relatively thin cross section (as can be seen in FIGS. 7A and 8A, the inboard wiper seal has a cross section dimension or thickness that is less than the adhesive thickness or gap dimension between the front surface of the wide angle element and the rear surface of the front substrate) and may have a thin section or weakened section to enhance flexing, such as via a living hinge configuration or the like. Inboard wiper seal 315b flexes as the reflective element is attached to the back plate and engages and seals against the rear surface of the front substrate of the reflective element to limit or substantially preclude adhesive intrusion between the inboard wiper seal and the rear surface of the front substrate of the reflective element.

In the illustrated embodiment, pocket portion 313b of back plate 313 is formed to establish or provide a cavity 317 behind outboard wiper seal 315a and between the perimeter edge of the wide angle element 322 and the perimeter boarder region 313e of back plate 313. Thus, as wide angle element 322 is received into pocket portion 313b and adhered to the rear surface of front substrate 312a (for example, as the wide angle element is moved to the appropriate location relative to and the appropriate spacing from the rear surface of the reflective element, such as via a robotic device, such as by utilizing aspects of the system described in U.S. patent application Ser. No. 12/187,725, filed Aug. 7, 2008, which is hereby incorporated herein by reference in its entirety), any excess optical adhesive may flow out from between the front surface 322a of wide angle element 322 and the rear surface of front substrate 312a and into the cavity 317, whereby the excess adhesive is not disposed between the back plate and the reflective element and is not readily discernible by a person viewing the reflective element when the mirror assembly is normally mounted at a vehicle. Likewise, a cavity may be established between the inboard perimeter edge regions of the wide angle element and the pocket portion 313c of back plate 313 to receive excess adhesive that may flow from between the front surface of the wide angle element and the rear surface of the front substrate of the reflective element so that the adhesive is not readily viewable or discernible by a person viewing the reflective element when the mirror assembly is normally mounted at a vehicle.

Optionally, and as shown in FIGS. 9-11, a reflective element assembly 311' may include an auxiliary wide angle element 322' adhered to a rear surface of a reflective element 312' via an optical adhesive, with a wiper seal that has an outboard wiper seal or element 315a' and an inboard wiper seal or element 315b' established at the receiving portion or pocket portion 313b' of the back plate 313', such as in a similar manner described above. In the illustrated embodiment, outboard wiper seal 315a' is substantially similar in construction as inboard wiper seal 315b', and both are similar in construction to inboard wiper seal 315b, discussed above, such that a detailed discussion of the wiper seals need not be repeated herein.

As shown in FIG. 10A, wiper seals 315a', 315b' are initially formed so that they protrude towards the reflective element substrate 312a' (upwards in FIG. 10A) and beyond the location where the rear surface of the reflective element substrate 312a' will be when the reflective element is attached to the back plate 313'. When the back plate 313' is attached to the reflective element 312', the wiper seals 315a', 315b' will engage the rear surface of the reflective element substrate 312a' and will flex and seal or substantially seal against the reflective element substrate, as can be seen in FIG. 10B.

Optionally, and as shown in FIGS. 12-14, a reflective element assembly 311" may include an auxiliary wide angle element 322" adhered to a rear surface of a reflective element 312" via an optical adhesive, with a wiper seal that has an outboard wiper seal or element 315a" and an inboard wiper seal or element 315b" established at the receiving portion or pocket portion 313b" of the back plate 313", such as in a similar manner described above. In the illustrated embodiment, outboard wiper seal 315a" is similar in shape to wiper seal 315a, discussed above, but may have reduced flexibility. As can be seen in FIGS. 13A and 14A, outboard wiper seal 315a" engages the rounded or ground perimeter edge region 312c" of the mirror reflective element substrate 312a" when the back plate 313" is attached to the reflective element 312". Inboard wiper seal 315b" may be substantially similar in construction as inboard wiper seals 315b, 315b', discussed above, such that a detailed discussion of the wiper seals need not be repeated herein.

Thus, the wiper seals function to engage and seal or substantially seal against the rear surface of the reflective element substrate (such as the rear surface of a front substrate of a cutaway electro-optic reflective element or the rear surface of a rear substrate of an electro-optic reflective element or the rear surface of a single pane non-electro-optic reflective element or the like). The wiper seals are small and may be smaller than the gap between the front surface of the wide angle element and the rear surface of the reflective element substrate (with such a gap being established by the optical adhesive disposed therein and by the adhering process of adhering the wide angle element to the reflective element substrate, such as a robotic application process or the like). Thus, the present invention provides a sealing rib to reduce or substantially eliminate the glue squeeze out cosmetic issues on such mirror assemblies with auxiliary wide angle elements adhered to a rear surface of a mirror substrate. By substantially precluding glue squeeze out issues, the present invention provides a more consistent method to create a clean look at the outside edge of the glass mirror substrate without adding cost to the assembly or a difficult-to-handle border seal.

The blind spot or auxiliary wide angle element may be formed via any suitable means, such as by grinding the curved rear surface of the wide angle element from a glass sheet or cut element or substrate. Thus, for example, a flat glass sheet or shape can be provided, and the likes of a diamond wheel or the like can be used to grind away or sculpt a concave depression or form at the rear of the shape by removal of glass material. After, finer grinding and polishing to an optical glass finish, the concave depression so formed can be reflector coated (such as sputter coating a metallic reflector such as aluminum or the like) and can be paint or ink protected for mechanical and/or environmental protection. Thus, and when viewed through the opposing flat front face or surface, the viewer sees a convex reflective surface established by such methods.

Figure 15:
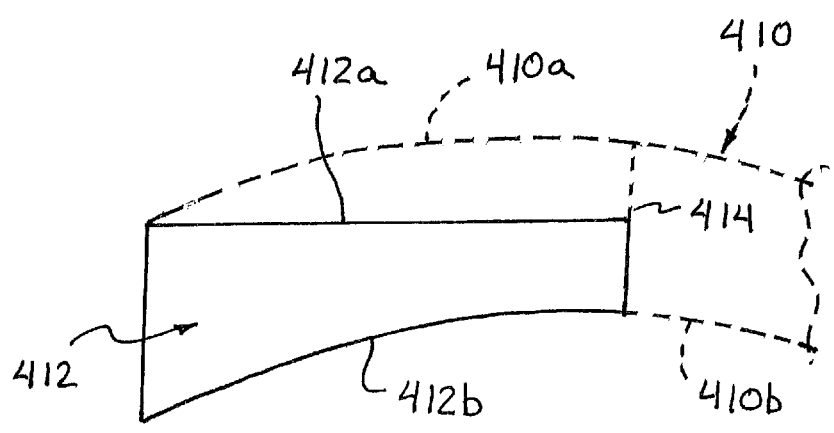
FIG. 15 is a sectional view of a wide angle element formed from a curved or bent glass substrate or sheet in accordance with the present invention.

Optionally, and preferably, it is envisioned that the wide angle element may be formed from a bent or curved sheet of glass or bent or curved glass element. For example, and with reference to FIG. 15, a curved substrate or curved sheet of glass 410 comprises a curved front surface 410a and a curved rear surface 410b. The sheet of glass 410 is cut to a shape of the wide angle element 412 (such as by cutting the sheet of glass at cut lines 414 in FIG. 15). The front surface 410a of the cut sheet of glass 410 is ground to be a generally planar surface that corresponds to the planar front surface 412a of the cut or formed wide angle element 412.

Thus, the wide angle element is formed from a curved sheet of glass, such as a relatively thick sheet of glass (such as, for example, a sheet of glass that is about 10 mm to about 12 mm thick) with the radius of curvature of the curved or bent sheet of glass corresponding to the desired or selected radius of curvature of the rear surface 412b of the wide angle element 412. Thus, the curved rear surface of the wide angle element is formed by the bending or curving of the glass sheet and not be grinding a curved surface at the rear of the wide angle element. The present invention thus reduces or limits or eliminates the complex grinding and polishing of a convex reflective surface at the rear of the wide angle element.

For example, and with reference to FIG. 16, a method 420 of manufacturing or forming an auxiliary wide angle element for an exterior rearview mirror assembly of a vehicle may comprise selecting or obtaining a large sheet of glass at 422, with the glass having a thickness of about 10 mm to about 12 mm or to about 15 mm (or having a greater thickness or a thickness less than 10 mm, depending on the particular application of the wide angle element and exterior mirror assembly). The glass sheet is bent or curved at 424 to the desired curvature (that corresponds to the desired curvature of the rear reflecting surface of the completed wide angle element), and individual glass shapes are cut from the bent glass sheet at 426. The shapes are mounted at or supported at a support device at 428, such as a vacuum assisted chuck or the like, with the support device having a curved support surface or saddle that engages and generally corresponds to the curved rear surface of the cut shape. A grinding wheel (such as a rough diamond-wheel or other suitable grinding device) engages the outwardly curved surface of the cut shape and grinds or sculpts that surface to a generally planar surface at 430. The grinding wheel is indexed toward the cut shape as it grinds the surface to a planar or flat surface. The grinding process may include a rough grinding step or process 430, which is followed by a fine grinding step or process and then a polishing step or process at 432, in order to provide the desired flat or planar surface and optical glass finish at the front surface of the wide angle element. After the cut shape is ground so that its front surface is planar and polished, the ground element or shape is demounted from the chuck and the rear concave-curved surface of the cut shape is coated with a reflector coating at 434, such as a metallic reflector coating (such as a silver or silver alloy reflector coating or the like), such that the element forms a second-surface convex mirror element as seen through the front flat face of the coated shape or element. The rear reflector surface and the perimeter edges of the cut shape may be painted or coated at 436 with an opaque or dark (such as black) paint or coating material, and optionally the perimeter border region of the front planar surface may be coated with the opaque or dark material or coating (such as by utilizing aspects of the wide angle reflectors described in U.S. patent application Ser. No. 12/187,725, filed Aug. 7, 2008, which is hereby incorporated herein by reference in its entirety). The paint or opaque protective coating or layer provides mechanical and/or environmental protection of the reflector layer or layers at the rear surface of the wide angle element.

Therefore, the present invention provides a method of manufacturing a wide angle element that includes providing a curved sheet of glass or curved substrate. The curved sheet of glass may have a mirror reflector coating established at its curved rear surface, and is cut to at least one (and optionally multiple) wide angle element profile/profiles. The entire wide angle element may be painted and then the front curved surface of the element may be ground to transform the curved painted front surface to a planar unpainted glass surface. The present invention thus provides enhanced manufacturing of the wide angle element and provides a reduced cost wide angle element. The wide angle element and method of manufacturing the wide angle element may utilize aspects of the mirror assemblies described in Ser. No. 12/054,960, filed Mar. 25, 2008 and published Sep. 18, 2008 as U.S. Pat. Publication No. US2008/0225421, which is hereby incorporated herein by reference in its entirety.

As stated above, the reflective element of the rearview mirror assemblies described herein may comprise an electro-optic or electrochromic reflective element or cell, such as an electrochromic mirror assembly and electrochromic reflective element utilizing principles disclosed in commonly assigned U.S. Pat. Nos. 7,195,381; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; and/or 4,712,879, and/or U.S. patent application Ser. No. 11/021,065, filed Dec. 23, 2004, now U.S. Pat. No. 7,255,451; and/or Ser. No. 11/226,628, filed Sep. 14, 2005 by Kamer et al. for MOUNTING ASSEMBLY FOR VEHICLE INTERIOR MIRROR; and/or PCT Application No. PCT/US2006/018567, filed May 15, 2006 and published Nov. 23, 2006 as International Publication No. WO 2006/124682, and/or European Patent Application No. EP0728618, filed Dec. 8, 1995 and published Aug. 28, 1996; and/or European Patent Application EP0729864, filed Dec. 11, 1995 and published Sep. 4, 1996; and/or Australian Patent Application AU4031795, filed Dec. 11, 1995 and published Feb. 8, 1996, and/or Australian Patent Application AU4031895, filed Dec. 11, 1995 and published Aug. 29, 1996, which are all hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties. The thicknesses and materials of the coatings on the substrates of the electrochromic reflective element, such as on the third surface of the reflective element assembly, may be selected to provide a desired color or tint to the mirror reflective element, such as a blue colored reflector, such as is known in the art and/or such as described in U.S. Pat. Nos. 7,274,501; 5,910,854 and 6,420,036, and in PCT Application No. PCT/US03/29776, filed Sep. 9, 2003 by Donnelly Corp. et al. for MIRROR REFLECTIVE ELEMENT ASSEMBLY, which are all hereby incorporated herein by reference in their entireties.

Optionally, use of an elemental semiconductor mirror, such as a silicon metal mirror, such as disclosed in U.S. Pat. Nos. 6,286,965; 6,196,688; 5,535,056; 5,751,489; and 6,065,840, and/or in U.S. patent application Ser. No. 10/993,302, filed Nov. 19, 2004 by Lynam for MIRROR REFLECTIVE ELEMENT FOR A VEHICLE, now U.S. Pat. No. 7,338,177, which are all hereby incorporated herein by reference in their entireties, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

Optionally, the reflective element may include a perimeter metallic band, such as the types described in U.S. Pat. Nos. 7,274,501 and 7,184,190; and/or PCT Application No. PCT/US03/29776, filed Sep. 19, 2003 by Donnelly Corp. et al. for ELECTROCHROMIC MIRROR ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; and/or U.S. patent application Ser. No. 11/021,065, filed Dec. 23, 2004 by McCabe et al. for ELECTRO-OPTIC MIRROR CELL, now U.S. Pat. No. 7,255,451; Ser. No. 11/226,628, filed Sep. 14, 2005 by Kamer et al. for MOUNTING ASSEMBLY FOR VEHICLE INTERIOR MIRROR, which are all hereby incorporated herein by reference in their entireties. Optionally, the reflective element may include indicia formed at and viewable at the reflective element, such as by utilizing aspects of the reflective elements described in PCT Application No. PCT/US2006/018567, filed May 15, 2006 and published Nov. 23, 2006 as International Publication No. WO 2006/124682; and U.S. provisional applications, Ser. No. 60/681,250, filed May 16, 2005; Ser. No. 60/690,400, filed Jun. 14, 2005; Ser. No. 60/695,149, filed Jun. 29, 2005; Ser. No. 60/730,334, filed Oct. 26, 2005; Ser. No. 60/750,199, filed Dec. 14, 2005; Ser. No. 60/774,449, filed Feb. 17, 2006; and Ser. No. 60/783,496, filed Mar. 18, 2006, which are all hereby incorporated herein by reference in their entireties.

Optionally, the reflective element may comprise a single substrate with a reflective coating at its rear surface. The mirror assembly thus may comprise a prismatic mirror assembly or planar or non-planar mirror or other mirror having a single substrate reflective element, such as a mirror assembly utilizing aspects of the mirror assemblies described in U.S. Pat. Nos. 6,318,870; 6,598,980; 5,327,288; 4,948, 242; 4,826,289; 4,436,371; and 4,435,042; and PCT Application No. PCT/US04/015424, filed May 18, 2004 by Donnelly Corporation et al. for MIRROR ASSEMBLY FOR VEHICLE; and U.S. patent application Ser. No. 10/933,842, filed Sep. 3, 2004, now U.S. Pat. No. 7,249,860, which are hereby incorporated herein by reference in their entireties. Optionally, the reflective element may comprise a conventional prismatic or flat reflective element or prism, or may comprise a prismatic or flat reflective element of the types described in U.S. Pat. No. 7,274,501, and/or PCT Application No. PCT/US03/29776, filed Sep. 19, 2003 by Donnelly Corp. et al. for MIRROR REFLECTIVE ELEMENT ASSEMBLY; U.S. patent application Ser. No. 10/709,434, filed May 5, 2004 by Lynam for MIRROR REFLECTIVE ELEMENT, now U.S. Pat. No. 7,420,756; Ser. No. 10/933,842, filed Sep. 3, 2004 by Kulas et al. for INTERIOR REARVIEW MIRROR ASSEMBLY, now U.S. Pat. No. 7,249,860; Ser. No. 11/021,065, filed Dec. 23, 2004 by McCabe et al. for ELECTRO-OPTIC MIRROR CELL, now U.S. Pat. No. 7,255,451; and/or Ser. No. 10/993,302, filed Nov. 19, 2004 by Lynam for MIRROR REFLECTIVE ELEMENT FOR A VEHICLE, now U.S. Pat. No. 7,338,177, and/or PCT Application No. PCT/US2004/015424, filed May 18, 2004 by Donnelly Corp. et al. for MIRROR ASSEMBLY FOR VEHICLE, which are all hereby incorporated herein by reference in their entireties.

Optionally, an anti-reflective (AR) coating may be disposed on the front surface of the reflective element (the surface facing generally rearward with respect to the direction of travel of the vehicle when the mirror assembly is mounted to the vehicle) to reduce glare at the viewed surface of the mirror reflective element (such as by utilizing aspects described in U.S. Pat. No. 5,076,674, and/or PCT Application No. PCT/US06/042718, filed Oct. 31, 2006, and published May 10, 2007 as International Publication No. WO 07/053,710, which is hereby incorporated herein by reference in its entirety). Optionally, a hydrophilic and/or hydrophobic coating may be disposed on the front surface of the reflective element to limit water or moisture accumulation at the reflective element and wide angle portion thereof. Optionally, the reflective element may include an anti-static means, such as a conductive coating, particularly a substantially transparent conductive coating, such as ITO, tin oxide and/or the like; index matching means to reduce internal and interfacial reflections, such as thin films of an appropriately selected optical path length; and/or light absorbing glass, such, as glass tinted to a neutral density, such as "GRAYLITE" gray tinted glass (commercially available from Pittsburgh Plate Glass Industries) and "SUNGLAS" gray tinted glass (commercially available from Ford Glass Co., Detroit, Mich.), which assists in augmenting contrast enhancement. Optionally, polymer interlayers, which may be tinted gray (such as those used in electrochromic devices as taught by and described in U.S. Pat. No. 4,712,879, which is hereby incorporated herein by reference in its entirety), may be incorporated into the electro-optic or electrochromic mirrors described herein.

Optionally, the mirror assembly may include one or more displays, such as the types disclosed in U.S. Pat. Nos. 5,530,240 and/or 6,329,925, which are hereby incorporated herein by reference in their entireties, and/or display-on-demand or transflective type displays, such as the types disclosed in U.S. Pat. Nos. 7,274,501; 7,184,190; 7,195,381; 6,690,268; 5,668,663 and/or 5,724,187, and/or in U.S. patent application Ser. No. 10/538,724, filed Jun. 13, 2005 by Hutzel et al. for ACCESSORY SYSTEM FOR VEHICLE; Ser. No. 11/284,543, filed Nov. 22, 2005, now U.S. Pat. No. 7,370,983; and/or Ser. No. 11/021,065, filed Dec. 23, 2004 by McCabe et al. for ELECTRO-OPTIC MIRROR CELL, now U.S. Pat. No. 7,255,451; and/or PCT Application No. PCT/US03/29776, filed Sep. 9, 2003 by Donnelly Corp. et al. for MIRROR REFLECTIVE ELEMENT ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; and/or PCT Application No. PCT/US03/40611, filed Dec. 19, 2003 by Donnelly Corp. et al. for ACCESSORY SYSTEM FOR VEHICLE, which are all hereby incorporated herein by reference in their entireties, or may include or incorporate video displays or the like, such as the types described in PCT Application No. PCT/US03/40611, filed Dec. 19, 2003 by Donnelly Corp. et al. for ACCESSORY SYSTEM FOR VEHICLE, and/or U.S. patent application Ser. No. 10/538,724, filed Jun. 13, 2005; and/or Ser. No. 11/284,543, filed Nov. 22, 2005, now U.S. Pat. No. 7,370,983; and/or U.S. provisional applications, Ser. No. 60/630,061, filed Nov. 22, 2004 by Lynam et al. for MIRROR ASSEMBLY WITH VIDEO DISPLAY; and Ser. No. 60/667,048, filed Mar. 31, 2005 by Lynam et al. for MIRROR ASSEMBLY WITH VIDEO DISPLAY, which are hereby incorporated herein by reference in their entireties.

Optionally, the mirror reflective element may comprise a transflective display on demand reflective element that is partially transmissive and partially reflective, so that the light emanating from the display element may be transmitted through the reflective element when an illumination source is activated, but the display is substantially non-visible or viewable when the illumination source is deactivated. Optionally, the mirror reflective element may comprise a single substrate or non-electro-optic reflective element, with the auxiliary wide angle reflective portion being integrally formed or established at a rear surface of the reflective element, while remaining within the spirit and scope of the present invention. For example, the reflective element may utilize aspects of the reflective elements described in U.S. Pat. Nos. 7,274,501 7,184,190; 6,690,268; 5,668,663 and/or 5,724,187, and/or in U.S. patent application Ser. No. 10/993,302, filed Nov. 19, 2004 by Lynam for MIRROR REFLECTIVE ELEMENT FOR A VEHICLE, now U.S. Pat. No. 7,338,177; and/or Ser. No. 11/021,065, filed Dec. 23, 2004 by McCabe et al. for ELECTRO-OPTIC MIRROR CELL, now U.S. Pat. No. 7,255,451, which are all hereby incorporated herein by reference in their entireties.

Optionally, the mirror assembly may include a blind spot indicator and/or a turn signal indicator, such as an indicator or indicators of the types described in U.S. provisional applications, Ser. No. 60/985,446, filed Nov. 5, 2007; Ser. No. 61/019,478, filed Jan. 7, 2008; Ser. No. 60/853,850, filed Oct. 24, 2006; Ser. No. 60/918,089, filed Mar. 15, 2007; and/or Ser. No. 60/970,687, filed Sep. 7, 2007, and/or U.S. Pat. Nos. 6,198,409; 5,929,786; and 5,786,772, and/or PCT Application No. PCT/US2006/026148, filed Jul. 5, 2006 by Donnelly Corp. et al. for VEHICLE EXTERIOR MIRROR ASSEMBLY WITH BLIND SPOT INDICATOR, and/or PCT Application No. PCT/US07/82099, filed Oct. 22, 2007, which are hereby incorporated herein by reference in their entireties. The signal indicator or indication module may include or utilize aspects of various light modules or systems or devices, such as the types described in U.S. Pat. Nos. 6,227,689; 6,582,109; 5,371,659; 5,497,306; 5,669,699; 5,823,654; 6,176,602; and/or 6,276,821, and/or U.S. patent application Ser. No. 11/520,193, filed Sep. 13, 2006, now U.S. Pat. No. 7,581,859, and/or PCT Application No. PCT/US2006/018567, filed May 16, 2006 and published Nov. 23, 2006 as International Publication No. WO 2006/124682, which are hereby incorporated herein by reference in their entireties.

Such an indicator or indicators may function as a lane change assist (LCA) indicator or indicators and/or a blind spot indicator or indicators. Such blind spot indicators are typically activated when an object is detected (via a side object or blind spot detection system or the like such as described in U.S. Pat. Nos. 7,038,577; 6,882,287; 6,198,409; 5,929,786; and 5,786,772, and/or U.S. patent application Ser. No. 11/315,675, filed Dec. 22, 2005 by Higgins-Luthman for OBJECT DETECTION SYSTEM FOR VEHICLE, now U.S. Pat. No. 7,720,580; and/or PCT Application No. PCT/US2006/026148, filed Jul. 5, 2006 by Donnelly Corp. et al. for VEHICLE EXTERIOR MIRROR ASSEMBLY WITH BLIND SPOT INDICATOR, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane. Optionally, and alternately, the indicator or indicators may function as a lane change assist indicator or indicators, where the host vehicle may be detected to be moving into an adjacent lane without the turn signal being activated, and an object or vehicle may be detected at the adjacent lane, whereby the LCA indicator or indicators may be activated to provide an alert to the driver of the lane change to assist the driver in avoiding unintentional lane changes and/or lane changes when a vehicle or object is detected in the adjacent lane.

The blind spot indicators thus may be operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,038,577; 6,882,287; 6,198,409; 5,929,786; and/or 5,786,772, and/or U.S. patent application Ser. No. 11/239,980, filed Sep. 30, 2005 by Camilleri et al. for VISION SYSTEM FOR VEHICLE, now U.S. Pat. No. 7,881, 496; and/or Ser. No. 11/315,675, filed Dec. 22, 2005 by Higgins-Luthman for OBJECT DETECTION SYSTEM FOR VEHICLE, now U.S. Pat. No. 7,720,580, and/or U.S. provisional applications, Ser. No. 60/638,687, filed Dec. 23, 2004 by Higgins-Luthman for OBJECT DETECTION SYSTEM FOR VEHICLE; Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; and/or Ser. No. 60/618,686, filed Oct. 14, 2004 by Laubinger for VEHICLE IMAGING SYSTEM, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610 and/or 6,757,109, and/or U.S. patent application Ser. No. 10/418,486, filed Apr. 18, 2003 by McMahon et al. for VEHICLE IMAGING SYSTEM, now U.S. Pat. No. 7,005,974, and/or of the automatic headlamp controls described in U.S. Pat. Nos. 5,796,094 and/or 5,715,093; and/or U.S. patent application Ser. No. 11/105,757, filed Apr. 14, 2005, now U.S. Pat. No. 7,526,103; and/or U.S. provisional application Ser. No. 60/607,963, filed Sep. 8, 2004 by Schofield for IMAGING SYSTEM FOR VEHICLE, and/or of the rain sensors described in U.S. Pat. Nos. 6,250,148 and 6,341,523, and/or of other imaging systems, such as the types described in U.S. Pat. Nos. 6,353,392 and 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962; 6,097,023 and 5,796,094, and U.S. patent application Ser. No. 09/441,341, filed Nov. 16, 1999 by Schofield et al. for VEHICLE HEADLIGHT CONTROL USING IMAGING SENSOR, now U.S. Pat. No. 7,339,149, and/or PCT Application No. PCT/US2003/036177 filed Nov. 14, 2003, published Jun. 3, 2004 as PCT Publication No. WO 2004/047421 A3, with all of the above referenced U.S. patents, patent applications and provisional applications and PCT applications being commonly assigned and being hereby incorporated herein by reference in their entireties.

Optionally, the mirror assembly may support one or more other accessories or features, such as one or more electrical or electronic devices or accessories. For example, illumination sources or lights, such as map reading lights or one or more other lights or illumination sources, such as illumination sources of the types disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 6,971,775; 7,195,381; 7,249,860; and/or 5,669,698, which are hereby incorporated herein by reference in their entireties, may be included in the mirror assembly. The illumination sources and/or the circuit board may be connected to one or more buttons or inputs for activating and deactivating the illumination sources. Optionally, the mirror assembly may also or otherwise include other accessories, such as microphones, such as analog microphones or digital microphones or the like, such as microphones of the types disclosed in U.S. Pat. Nos. 6,243,003; 6,278,377; and/or 6,420,975, and/or in U.S. patent application Ser. No. 10/529,715, filed Mar. 30, 2005, published on May 25, 2006 as U.S. Pat. Publication No. US-2006-0109996-A1; and/or in PCT Application No. PCT/US03/308877, filed Oct. 1, 2003 by Donnelly Corp. et al. for MICROPHONE SYSTEM FOR VEHICLE, which are hereby incorporated herein by reference in their entireties.

Optionally, the mirror assembly may also or otherwise include other accessories, such as a telematics system, speakers, antennas, including global positioning system (GPS) or cellular phone antennas, such as an ONSTAR® system as found in General Motors vehicles and such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,477,464; 6,678,614; 6,946,978; 7,167,796; 7,308,341; and/or 7,004,593 U.S. patent application Ser. No. 10/529,715, filed Mar. 30, 2005, published on May 25, 2006 as U.S. Pat. Publication No. US-2006-0109996-A1; and/or PCT Application No. PCT/US03/40611, filed Dec. 19, 2003 by Donnelly Corporation et al. for ACCESSORY SYSTEM FOR VEHICLE, and/or PCT Application No. PCT/US03/308877, filed Oct. 1, 2003 by Donnelly Corp. for MICROPHONE SYSTEM FOR VEHICLE, a communication module, such as disclosed in U.S. Pat. No. 5,798,688, a voice recorder, a blind spot detection and/or indication system, such as disclosed in U.S. Pat. Nos. 7,038,577; 6,882,287; 5,929,786 and/or 5,786,772, and/or U.S. patent application Ser. No. 11/315,675, filed Dec. 22, 2005 by Higgins-Luthman for OBJECT DETECTION SYSTEM FOR VEHICLE, now U.S. Pat. No. 7,720,580; and/or U.S. provisional applications, Ser. No. 60/638,687, filed Dec. 23, 2004; Ser. No. 60/784,570, filed Mar. 22, 2006; and/or Ser. No. 60/696,953, filed Jul. 6, 2006, and/or PCT Application No. PCT/US2006/026148, filed Jul. 5, 2006, transmitters and/or receivers, such as for a garage door opener or a vehicle door unlocking system or the like (such as a remote keyless entry system), a digital network, such as described in U.S. Pat. No. 5,798,575, a compass indicator or display and/or a temperature indicator or display, such as described in U.S. Pat. Nos. 7,004,593 and/or 7,329,013, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 6,690,268 and 6,847,487; and/or U.S. patent application Ser. No. 11/105,757, filed Apr. 14, 2005, now U.S. Pat. No. 7,526,103; Ser. No. 11/239,980, filed Sep. 30, 2005, now U.S. Pat. No. 7,881,496; and/or Ser. No. 11/334,139, filed Jan. 18, 2006, now U.S. Pat. No. 7,400,435, a video display device such as a fixed video device or module or a slide out or extendable/retractable video device or module, such as described in U.S. patent application Ser. No. 10/538,724, filed Jun. 13, 2005; and/or Ser. No. 11/284,543, filed Nov. 22, 2005, now U.S. Pat. No. 7,370,983, PCT Application No. PCT/US06/042718, filed Oct. 31, 2006; and/or PCT Application No. PCT/US03/40611, filed Dec. 19, 2003, a video device for internal cabin surveillance (such as for sleep detection or driver drowsiness detection or the like) and/or video telephone function, such as disclosed in U.S. Pat. Nos. 5,760,962 and/or 5,877,897, an occupant detection system (such as the types described in PCT Application No. PCT/US2005/042504, filed Nov. 22, 2005 and published Jun. 1, 2006 as International Publication No. WO 2006/058098 A2, a heating element, particularly for an exterior mirror application, such as the types described in U.S. patent application Ser. No. 11/334,139, filed Jan. 18, 2006, now U.S. Pat. No. 7,370,983, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; and/or 6,731,205; and/or U.S. patent application Ser. No. 11/232,324, filed Sep. 21, 2005 by O'Brien et al. for TIRE PRESSURE ALERT SYSTEM, now U.S. Pat. No. 7,423,522; and/or U.S. provisional application Ser. No. 60/611,796, filed Sep. 21, 2004, and/or an ONSTAR® system and/or any other accessory or circuitry or the like (with all of the above-referenced patents and PCT and U.S. patent applications being commonly assigned to Donnelly Corporation, and with the disclosures of the referenced patents and patent applications being hereby incorporated herein by reference in their entireties).

Optionally, the mirror assembly may accommodate other accessories or circuitry or the like as well, such as a rain sensor or imaging device or the like. For example, the mirror assembly may include a mounting portion (such as the types described in U.S. patent application Ser. No. 11/226,628, filed Sep. 14, 2005, which is hereby incorporated herein by reference in its entirety), and may include a rain sensor or the like and may position the rain sensor against the windshield, such as described in U.S. Pat. Nos. 6,250,148; 6,341,523; 6,824,281; 6,516,664; 6,968,736; 7,188,963; and/or Ser. No. 11/201,661, filed Aug. 11, 2005 by DeWard et al. for ACCESSORY MODULE FOR VEHICLE, now U.S. Pat. No. 7,480,149, which are all hereby incorporated herein by reference in their entireties. Optionally, the mirror assembly may include an imaging device, such as an imaging array sensor for imaging systems of the types described in U.S. Pat. Nos. 6,946,978; 6,757,109; 6,717,610; 6,396,397; 6,201,642; 6,353,392; 6,313,454; 6,396,397; 5,550,677; 5,670,935; 5,796,094; 5,877,897; 6,097,023; 6,498,620; 7,339,149; and/or 7,038,577; and/or PCT application No. PCT/US2006/041709, filed Oct. 27, 2006 by Donnelly Corp. et al. for CAMERA MODULE FOR VEHICLE VISION SYSTEM, and published May 10, 2007 as International Publication No. WO 07/053,710; and/or U.S. patent application Ser. No. 11/672,070, filed Feb. 7, 2007, which are all hereby incorporated herein by reference in their entireties.

Optionally, the mirror assembly may include one or more user actuatable inputs or input devices or human machine interfaces. For example, the inputs or user interfaces may include buttons, such as are described in U.S. Pat. No. 6,501,387, and/or U.S. patent application Ser. No. 11/451,639, filed Jun. 13, 2006 by Uken for MIRROR ASSEMBLY FOR VEHICLE, now U.S. Pat. No. 7,527,403, which are hereby incorporated herein by reference in their entireties, or that include touch/proximity sensors such as are disclosed in U.S. Pat. Nos. 6,001,486; 6,310,611; 6,320,282; 6,627,918; and 7,224,324, and PCT Application No. PCT/US03/40611, filed Dec. 19, 2003, which are hereby incorporated herein by reference in their entireties, or that include other types of buttons or switches, such as those described in U.S. patent application Ser. No. 11/029,695, filed Jan. 5, 2005 by Lindahl et al. for MIRROR ASSEMBLY, now U.S. Pat. No. 7,253,723; and/or PCT Application No. PCT/US2004/015424, filed May 18, 2004 by Donnelly Corp. et al. for MIRROR ASSEMBLY FOR VEHICLE, which are hereby incorporated herein by reference in their entireties, or that include fabric-made position detectors, such as are disclosed in U.S. Pat. Nos. 6,504,531; 6,501,465; 6,492,980; 6,452,479; 6,437,258; and 6,369,804, which are hereby incorporated herein by reference in their entireties. The manual inputs or user actuatable inputs or actuators may control or adjust or activate/deactivate one or more accessories or elements or features. For touch sensitive inputs or applications or switches, the mirror assembly or accessory module or input may, when activated, provide a positive feedback (such as activation of an illumination source or the like, or such as via an audible signal, such as a chime or the like, or a tactile or haptic signal, or a rumble device or signal or the like) to the user so that the user is made aware that the input was successfully activated.

Changes and modifications to the specifically described embodiments may be carried out without departing from the principles of the present invention, which is intended to be limited only by the scope of the appended claims as interpreted according to the principles of patent law.

The invention claimed is:

1. A mirror reflective element assembly for an exterior rearview mirror assembly of a vehicle, said mirror reflective element assembly comprising:

a reflective element comprising a glass mirror substrate, said reflective element having a front surface and a rear surface and a first reflector portion and a second reflector portion, said first reflector portion having a first reflective coating disposed thereat;

an auxiliary wide angle element disposed at said rear surface of said glass mirror substrate and at said second reflector portion, said auxiliary wide angle element comprising a glass element having a curved rear surface with a second reflective coating disposed at said curved rear surface;

an optical coupling element disposed between a front surface of said auxiliary wide angle element and said rear surface of said reflective element, said optical coupling element comprising a substantially optically clear and flexible elastomer;

a back plate attached at said rear surface of said reflective element, said back plate having a receiving portion generally at said second reflector portion when said back plate is attached to said reflective element, said auxiliary wide angle element being at least partially received in said receiving portion of said back plate;

wherein said back plate comprises at least one sealing element around a perimeter region of said receiving portion, and wherein said at least one sealing element comprises a flexible sealing lip; and wherein said at least one sealing element flexes as it engages said rear surface of said mirror substrate during attachment of said back plate to said reflective element and wherein said at least one sealing element engages and substantially seals against said rear surface of said mirror substrate when said back plate is attached to said reflective element to contain said optical coupling element between said front surface of said auxiliary wide angle element and said rear surface of said reflective element and to limit intrusion of said optical coupling element between said back plate and said mirror substrate.

2. The mirror reflective element assembly of claim 1, wherein said optical coupling element comprises one of a silicone, a silicone gel, a polyurethane, an optically clear thermoplastic elastomer, an optically clear thermoplastic polyurethane, an optically clear EPDM, and a hot melt silicone.

3. The mirror reflective element assembly of claim 1, wherein said optical coupling element has a hardness of less than about a 20 Shore "A" hardness.

4. The mirror reflective element assembly of claim 1, wherein said optical coupling element comprises a preformed element that is established at said front surface of said auxiliary wide angle element.

5. The mirror reflective element assembly of claim 1, wherein said optical coupling element includes a peel-off membrane at a surface opposite from the surface to which said auxiliary wide angle element is attached, said peel-off membrane being removable to expose a surface for engaging said rear surface of said glass mirror substrate.

6. The mirror reflective element assembly of claim 1 further comprising a cover plate attached to said receiving portion, said cover plate substantially encasing said auxiliary wide angle element within said receiving portion.

7. The mirror reflective element assembly of claim 1, wherein said second reflector portion is devoid of said first reflective coating.

8. The mirror reflective element assembly of claim 1 further comprising a demarcation element disposed at a perimeter region of said auxiliary wide angle element.

9. The mirror reflective element assembly of claim 1, wherein said auxiliary wide angle element comprises a curved glass element, and wherein a front portion of said curved glass element is removed to establish said front surface of said auxiliary wide angle element.

10. The mirror reflective element assembly of claim 1, wherein said back plate has a mounting structure for mounting said back plate and said reflective element and said auxiliary wide angle element to a mirror actuator, said back plate mounting structure establishing a space at said mirror actuator that is sufficient for a portion of said auxiliary wide angle element to be disposed between said rear surface of said reflective element and said mirror actuator.

11. The mirror reflective element assembly of claim 10, wherein said front surface of said reflective element is generally at or flush with a perimeter edge of a mirror casing of said mirror reflective element assembly.

12. The mirror reflective element assembly of claim 10, wherein said auxiliary wide angle element is adhered to said rear surface of said mirror substrate via said optical coupling element.

13. The mirror reflective element assembly of claim 1, wherein said reflective element comprises an electro-optic reflective element having a front substrate and a rear substrate with an electro-optic medium disposed therebetween.

14. The mirror reflective element assembly of claim 13, wherein said rear substrate is cut away at said second reflector portion and said auxiliary wide angle element is adhered to a rear surface of said front substrate with no part of the said rear substrate between said auxiliary wide angle element and said rear surface of said front substrate, and wherein said sealing element engages and seals against said rear surface of said front substrate.

15. The mirror reflective element assembly of claim 14, wherein said at least one sealing element protrudes towards said rear surface of said mirror substrate and flexes to extend partially along said rear surface of said mirror substrate when said back plate is attached to said reflective element.

16. The mirror reflective element assembly of claim 1, wherein said at least one sealing element protrudes towards said rear surface of said mirror substrate and flexes to extend partially along said rear surface of said mirror substrate when said back plate is attached to said reflective element.

17. The mirror reflective element assembly of claim 16, wherein said at least one sealing element limits squeeze out of said optical coupling element from said receiving portion of said back plate when said auxiliary wide angle element is disposed at said rear surface of said mirror substrate.

18. The mirror reflective element assembly of claim 17, wherein said optical coupling element comprises an adhesive.

* * * * *

UNITED STATES PATENT AND TRADEMARK OFFICE
CERTIFICATE OF CORRECTION

PATENT NO. : 8,491,137 B2  
APPLICATION NO. : 12/561642  
DATED : July 23, 2013  
INVENTOR(S) : Niall R. Lynam et al.

It is certified that error appears in the above-identified patent and that said Letters Patent is hereby corrected as shown below:

Title Page

Item (75) "Mitchell Burkert" should be --Mitchell Burkhert--

In the Specification

Column 5:  
Line 30, "thereof;" should be --thereof,--

Column 11:  
Line 49, "darn" should be --dam--

Column 13:  
Line 29, Delete "," after "has"

Column 23:  
Line 53, "Kamer" should be --Karner--

Column 24:  
Line 45, "Kamer" should be --Karner--

Column 25:  
Line 34, "WO 07/053,710" should be --WO 07/053710--  
Line 45, Delete "," after "such"

Column 26:  
Line 36, "7,274,501 7,184,190" should be --7,274,501-7,184,190--

Column 29:  
Line 45, Insert --,-- after "application"

Signed and Sealed this  
Twenty-fifth Day of February, 2014

Michelle K. Lee  
*Deputy Director of the United States Patent and Trademark Office*